US012309795B2

(12) United States Patent
He et al.

(10) Patent No.: US 12,309,795 B2
(45) Date of Patent: May 20, 2025

(54) CONFIRMATORY SIGNALING FOR MULTI-PUSCH AND MULTI-PDSCH SCHEDULING

(71) Applicant: APPLE INC., Cupertino, CA (US)

(72) Inventors: Hong He, Cupertino, CA (US); Chunhai Yao, Beijing (CN); Dawei Zhang, Cupertino, CA (US); Haitong Sun, Cupertino, CA (US); Huaning Niu, Cupertino, CA (US); Jie Cui, Cupertino, CA (US); Oghenekome Oteri, San Diego, CA (US); Sigen Ye, San Diego, CA (US); Wei Zeng, Cupertino, CA (US); Weidong Yang, San Diego, CA (US); Yushu Zhang, Beijing (CN)

(73) Assignee: APPLE INC., Cupertino, CA (US)

(*) Notice: Subject to any disclaimer, the term of this patent is extended or adjusted under 35 U.S.C. 154(b) by 399 days.

(21) Appl. No.: 17/593,299

(22) PCT Filed: May 10, 2021

(86) PCT No.: PCT/CN2021/092741
§ 371 (c)(1),
(2) Date: Sep. 15, 2021

(87) PCT Pub. No.: WO2022/236571
PCT Pub. Date: Nov. 17, 2022

(65) Prior Publication Data
US 2023/0217450 A1 Jul. 6, 2023

(51) Int. Cl.
*H04W 72/23* (2023.01)
*H04W 72/1263* (2023.01)

(52) U.S. Cl.
CPC ....... *H04W 72/23* (2023.01); *H04W 72/1263* (2013.01)

(58) Field of Classification Search
CPC .. H04W 72/23; H04W 72/1263; H04L 5/001; H04L 5/0094
See application file for complete search history.

(56) References Cited

U.S. PATENT DOCUMENTS

| 10,716,133 B2 | 7/2020 | Chatterjee et al. |
| 11,283,551 B2 * | 3/2022 | Lee ................... H04W 72/1268 |

(Continued)

FOREIGN PATENT DOCUMENTS

| CN | 109804690 A * | 5/2019 | ........... H04L 1/1812 |
| CN | 110535610 A | 12/2019 | |

(Continued)

OTHER PUBLICATIONS

Lenovo, Motorola Mobility, "Potential enhancement to DCI based power saving adaptation", R1-2005936, 3GPP TSG RAN WG1 Meeting #102-e, e-Meeting, Agenda Item 8.7.2, Aug. 17-28, 2020, 3 pages.

(Continued)

*Primary Examiner* — Schquita D Goodwin
(74) *Attorney, Agent, or Firm* — Dorsey & Whitney LLP

(57) ABSTRACT

Systems and methods disclosed herein relate to confirmatory signaling sent by a base station for the use of multiple physical uplink control channels (multi-PUSCH) or multiple physical downlink control channels (multi-PDSCH) scheduled in downlink control information (DCI) sent by the base station. Confirmatory signaling may be provided in the form of DCI, or in the form of a physical confirmation indicator channel (PCICH). Confirmatory signaling in DCI may confirm multi-PUSCH/multi-PDSCH scheduling according to one or more UE, and according to one or more CC used by each of the one or more UE using a bitmap. Confirmatory signaling in PCICH may confirm the multi-PUSCH/multi-PDSCH scheduling according to one or more UE. In these embodiments, a symbol for each such UE is spread accord- (Continued)

ing to different orthogonal covering codes (OCC), and such spreaded symbols are sent to the UE in a resource element set (RES) of a physical radio block (PRB).

19 Claims, 18 Drawing Sheets

(56) References Cited

U.S. PATENT DOCUMENTS

| | | |
|---|---|---|
| 2014/0328260 A1 | 11/2014 | Papasakellariou et al. |
| 2018/0035242 A1 | 2/2018 | Yi |
| 2018/0092083 A1 | 3/2018 | Agarwal et al. |
| 2018/0368137 A1 | 12/2018 | Yin et al. |
| 2019/0045533 A1 | 2/2019 | Chatterjee et al. |
| 2019/0103954 A1 | 4/2019 | Lee et al. |
| 2019/0253172 A1* | 8/2019 | Park ................ H04L 5/0026 |
| 2019/0254045 A1 | 8/2019 | Sadiq et al. |
| 2019/0380141 A1 | 12/2019 | Gupta et al. |
| 2020/0154467 A1* | 5/2020 | Gong ................ H04W 76/27 |
| 2020/0196333 A1* | 6/2020 | Lin .................... H04W 8/24 |
| 2020/0313809 A1 | 10/2020 | Park et al. |
| 2021/0050973 A1* | 2/2021 | Kwon ............... H04L 5/0023 |
| 2021/0051690 A1 | 2/2021 | He et al. |
| 2021/0144743 A1* | 5/2021 | Rastegardoost ...... H04W 72/23 |
| 2021/0184800 A1 | 6/2021 | Zhou et al. |
| 2021/0258998 A1* | 8/2021 | Khoshnevisan ...... H04L 5/0044 |
| 2021/0266876 A1 | 8/2021 | Zhou et al. |
| 2022/0095351 A1* | 3/2022 | Baldemair ........... H04L 5/0055 |
| 2022/0210816 A1* | 6/2022 | Wu ................... H04W 72/23 |
| 2022/0256511 A1* | 8/2022 | Zewail ............... H04L 5/0094 |
| 2022/0256543 A1 | 8/2022 | Tian et al. |
| 2022/0322341 A1* | 10/2022 | Tiirola ............. H04W 72/1263 |
| 2023/0030756 A1* | 2/2023 | Zhang ............... H04L 5/0053 |
| 2023/0038936 A1* | 2/2023 | Zheng ............... H04L 1/1854 |
| 2023/0059731 A1* | 2/2023 | Yuan ................. H04L 5/0055 |
| 2023/0155736 A1* | 5/2023 | Kim .................. H04W 72/23 370/329 |
| 2023/0216639 A1* | 7/2023 | Wang ................ H04L 5/0051 370/329 |

FOREIGN PATENT DOCUMENTS

| | | | |
|---|---|---|---|
| CN | 112335198 A | | 2/2021 |
| EP | 4228366 A1 | | 8/2023 |
| KR | 20210020727 A | * | 2/2021 |
| WO | 2019070579 A1 | | 4/2019 |
| WO | 2020141994 A1 | | 7/2020 |
| WO | 2020204637 A1 | | 10/2020 |
| WO | 2022212387 A1 | | 10/2022 |

OTHER PUBLICATIONS

PCT/CN2021/092741, International Search Report and Written Opinion, Feb. 10, 2022, 9 pages.
U.S. Appl. No. 17/593,302, Notice of Allowance, Apr. 5, 2024, 7 pages.
U.S. Appl. No. 17/593,302, Non-Final Office Action, Dec. 27, 2023, 9 pages.
Nokia, Nokia Shanghai Bell, "PDSCH/PUSCH enhancements", R1-2102562, 3GPP TSG RAN WG1 #104bis-e, e-Meeting, Agenda Item 8.2.5, Apr. 12-20, 2021, 29 pages.
PCT/CN2021/092690, International Search Report and Written Opinion, Feb. 11, 2022, 9 pages.
ZTE, Sanechips, "Remaining issues on scheduling and HARQ for NR-U", R1-1911824, 3GPP TSG RAN WG1 Meeting #99, Reno, Nevada, USA, Agenda Item 7.2.2.2.3, Nov. 18-22, 2019, 11 pages.

* cited by examiner

CONFIRMATORY SIGNALING FOR MULTI-PUSCH AND MULTI-PDSCH SCHEDULING

TECHNICAL FIELD

This application relates generally to wireless communication systems, including the use of downlink control information (DCI) that schedules multiple shared channels.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Physical uplink shared channels (PUSCH) and/or physical downlink control channels (PDSCH) may be used in a RAN between a base station and a UE for uplink or downlink communications respectively. In some RANs, PUSCH and/or PDSCH may be scheduled by downlink control information (DCI) sent by the base station to a UE on a physical downlink control channel (PDCCH).

It is contemplated that some RANs may operate in relatively high frequencies. For example, an NR RAN may operate with frequencies of up to 71 GHz. In these (and other) cases, it may be advantageous to use a single DCI to schedule multiple PUSCH (multi-PUSCH) or multiple PDSCH (multi-PDSCH). This scheduling of a multi-PUSCH or a multi-PDSCH in a single DCI may reduce overhead within the RAN as compared to the case where each PUSCH/PDSCH is instead individually scheduled with a corresponding DCI. In this disclosure, a DCI that schedules a multi-PUSCH or a multi-PDSCH may be referred to as an M-DCI, while a DCI that schedules only a single PUSCH or PDSCH may be referred to as an S-DCI.

DCI that are used for scheduling for PUSCH/PDSCH/multi-PUSCH/multi-PDSCH (and/or other purposes) may be received at the UE during a monitoring occasion (MO) used by that UE that is consistent with a search space configuration at that UE. Further, when a UE uses carrier aggregation (CA) with multiple component carriers (CCs), a DCI may be received on a CC that has the MO for that DCI.

Figure 1:
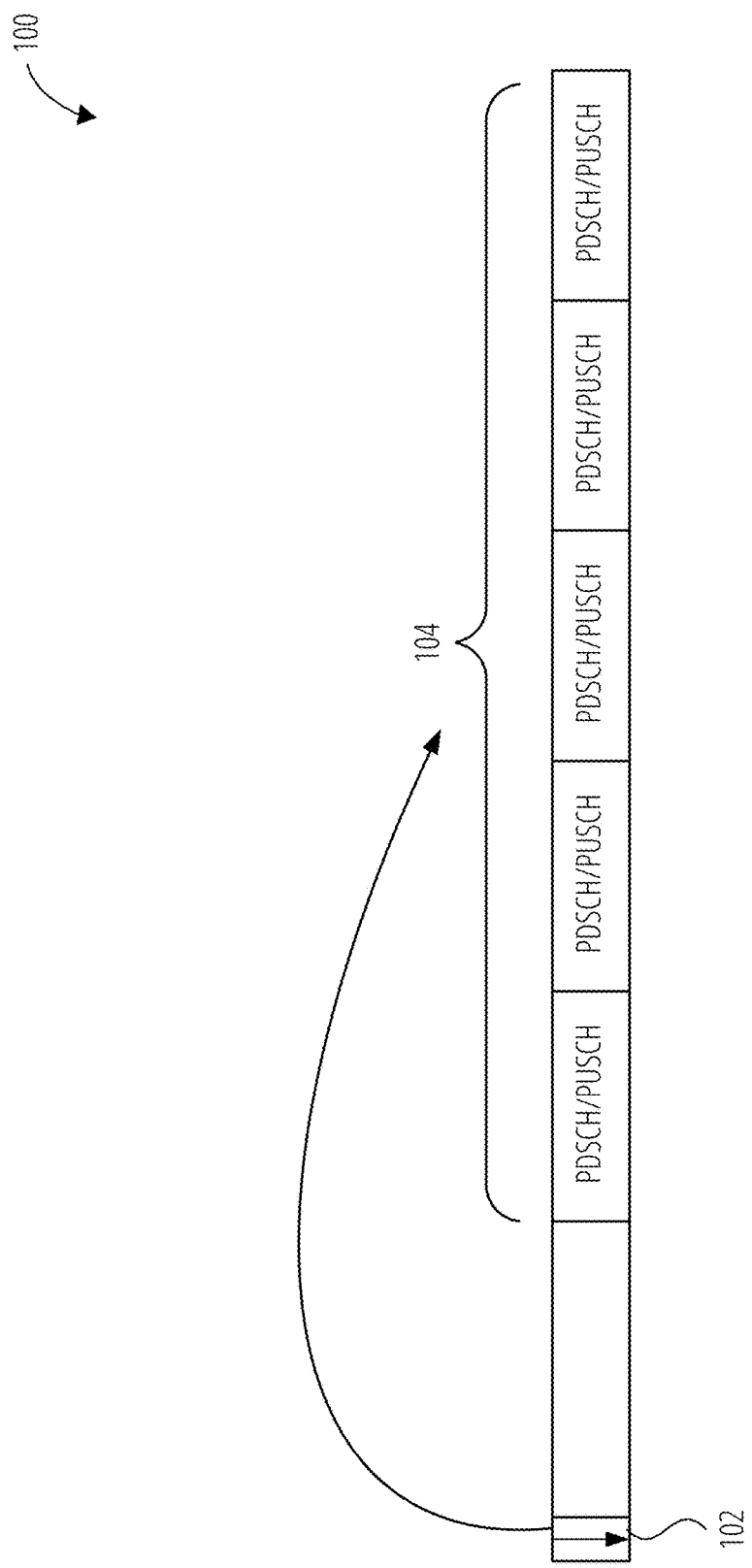
FIG. 1 illustrates signaling for using M-DCI to schedule a multi-PUSCH or a multi-PDSCH, according to an embodiment.

FIG. 1 illustrates signaling 100 for using M-DCI 102 to schedule a multi-PUSCH or a multi-PDSCH, according to an embodiment. A base station may send the M-DCI 102 to a UE. The M-DCI 102 schedules the multi-PUSCH or multi-PDSCH 104 as between the base station and the UE, such that the UE is informed of the timing of the multi-PUSCH or multi-PDSCH 104 (as illustrated).

Due to interference, low signal power, or other reasons, a DCI sent by the base station to the UE may be missed at the UE. Accordingly, the UE may be unaware of any resources scheduled by the DCI. These resources are accordingly not used by the UE to perform transmissions with/receive transmissions from the base station (and in this sense are wasted). In the case where a DCI schedules only a single PUSCH/PDSCH, it may be that this circumstance can be acceptable if it is not frequent. However, in cases where M-DCI (such as the M-DCI 102) is missed at the UE, the amount of wasted resources is greater than in the S-DCI case, to the extent that any resulting system degradation/spectrum efficiency impacts due to the wasting of such resources is less acceptable to the operator of the RAN.

Figure 2:
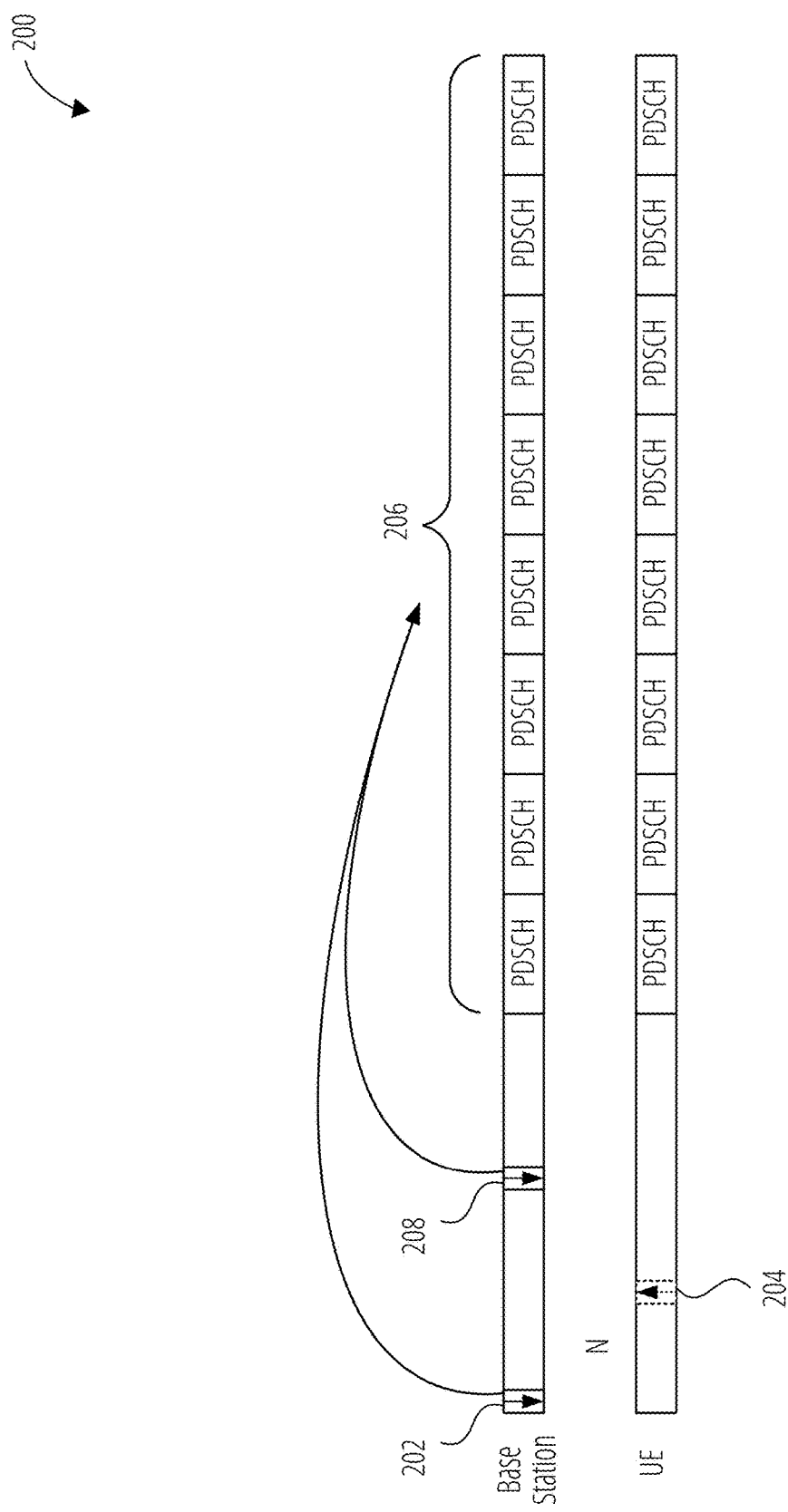
FIG. 2 illustrates signaling where a UE confirms multi-PUSCH or multi-PDSCH scheduled by an M-DCI by using confirmatory signaling, according to an embodiment.

FIG. 2 illustrates signaling 200 where a UE confirms multi-PUSCH or multi-PDSCH scheduled by an M-DCI 202 by using confirmatory signaling 208, according to an embodiment. In the embodiment of FIG. 2, the base station sends the M-DCI 202 to a UE to schedule the illustrated multi-PDSCH 206. Note that the multi-PDSCH 206 could instead be a multi-PUSCH in other embodiments.

To address the aforementioned issues with missed M-DCI, in response to the M-DCI 202, the UE may send the acknowledgement signaling 204 to the base station. This acknowledgement signaling 204 indicates to the base station that the M-DCI 202 was received at the UE. Upon receipt of the acknowledgement signaling 204, the base station can be sure that there is a joint understanding between the UE and the base station about the existence and timing of the multi-PDSCH 206. Had the acknowledgement signaling 204 not been sent by the UE (or had it not been properly received at the base station), the base station may have instead canceled the multi-PDSCH 206 (in order to not waste the resources of the multi-PDSCH 206, due to the unconfirmed receipt of the M-DCI 202 at the UE).

It is contemplated that the acknowledgement signaling 204 can take one or more of a variety of forms. For example, the acknowledgement signaling 204 may be implied through the use of uplink signals corresponding to the M-DCI 202, or may include hybrid automatic repeat request (HARQ) acknowledgement (HARQ-ACK) signaling (over physical uplink control channel (PUCCH)) and/or aperiodic sounding reference signal (A-SRS) signaling.

FIG. 2 also illustrates the confirmatory signaling 208. The confirmatory signaling 208 may be sent by the base station to the UE in order to confirm that the multi-PDSCH 206 (or, in other embodiments, the multi-PUSCH) as scheduled in the M-DCI 202 is still going forward. For example, the UE may not be expected to receive the multi-PDSCH 206 (or, in alternative embodiments, send on a multi-PUSCH) in the case where the M-DCI 202 is received at the UE but the confirmatory signaling 208 is not.

The confirmatory signaling 208 may be sent by the base station to the UE in response to the receipt at the base station of the acknowledgement signaling 204. However, this is not required as embodiments using confirmatory signaling 208 without the base station first receiving the acknowledgement signaling 204 are possible and would function appropriately, in the manner described herein.

The sending (or not) of the confirmatory signaling 208 to the UE allows the base station to effectively control the cancellation the multi-PDSCH 206 (or the multi-PUSCH) at the UE. For example, in embodiments that use the acknowledgement signaling 204, it may be the case that the acknowledgement signaling 204 was sent by the UE but was not received at the base station. In this circumstance, if the wireless communication system is not configured to use the confirmatory signaling 208, the base station would cancel its use of the multi-PDSCH 206 (due to never receiving the acknowledgement signaling 204) while UE would proceed to attempt to use the multi-PDSCH 206 (because it sent the acknowledgement signaling 204). This may cause interference on the channel (multi-PUSCH case) and/or the attempted decoding of data not for the UE at the UE (multi-PDSCH case). However, if the wireless communication system is configured to use the confirmatory signaling 208, then the base station can implicitly inform the UE of its cancelation of its use of the multi-PDSCH 206 (or multi-PUSCH) by withholding the confirmatory signaling 208. This allows the UE to (also) avoid using attempting to use the multi-PDSCH 206 (or multi-PUSCH) on the channel.

Other cases where the base station may wish to withhold the confirmatory signaling 208 to implicitly cancel the multi-PDSCH 206 (or multi-PDSCH) may include, for example, a case where latency sensitive traffic arrives for transmission to the UE after the M-DCI 202 is sent, and the subsequent use of the previously scheduled multi-PDSCH 206 (or multi-PDSCH) would cause unwanted delay for transmitting this traffic. This benefit may be applicable even in embodiments where acknowledgement signaling 204 is not used.

The confirmatory signaling 208 may be included in a UE-specific DCI format, it may be a group-common DCI format used to re-confirm the M-DCI 202, or it may be signaling of a physical confirmation indicator channel (PCICH), as will be described below.

Figure 3:
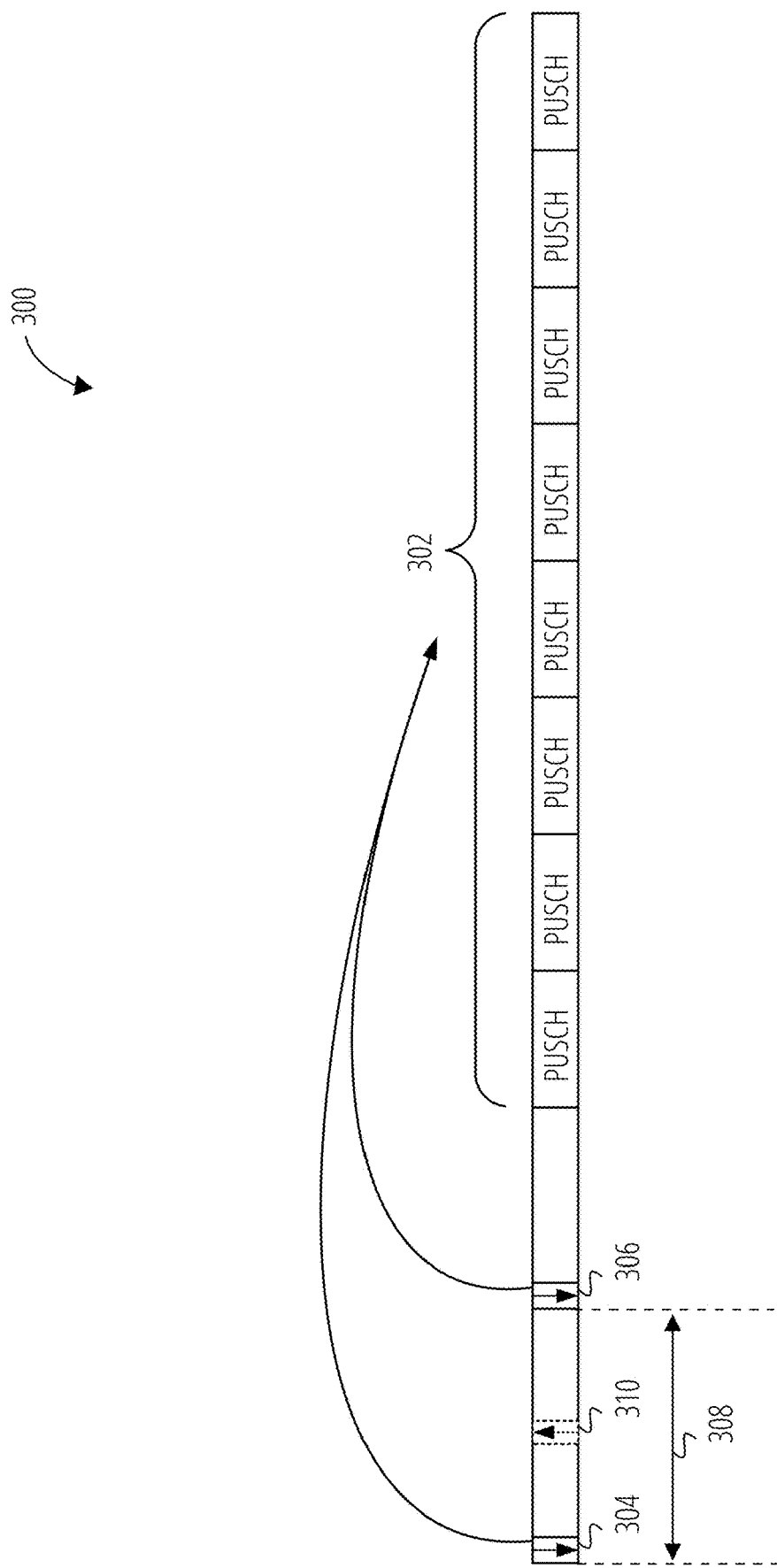
FIG. 3 illustrates signaling scheduling a multi-PUSCH using a first DCI, and wherein second DCI is used to carry confirmatory signaling, according to an embodiment.

FIG. 3 illustrates signaling 300 scheduling a multi-PUSCH 302 using a first DCI 304, and wherein second DCI 306 is used to carry confirmatory signaling, according to an embodiment. The first DCI 304 may be M-DCI. It should be understood that the use of the multi-PUSCH 302 could instead be a multi-PDSCH in other embodiments.

In FIG. 3, base station may send the UE the first DCI 304, the UE may (optionally) send the acknowledgement signaling 310 back to the base station, and the base station may then send the second DCI 306 to confirm that the base station's use of the multi-PUSCH 302 is going forward, in the manner described above. According to some embodiments, the UE's use of the multi-PUSCH 302 (or multi-PDSCH) is dependent on each of the reception of the first DCI 304 and the second DCI 306. In other words, the UE may cancel transmissions on the multi-PUSCH 302 (or any attempt to receive in the case of a multi-PDSCH) if the UE does not receive the second DCI 306.

The first DCI 304 may be of a first DCI format, and the second DCI 306 may be a second DCI format that is associated with the first DCI 304. For example, the second DCI 306 may be a known DCI format that is used in conjunction with M-DCI (such as the first DCI 304) that schedules multiple shared channels, as illustrated.

In a first embodiment according to FIG. 3, the UE may be provided with a pair of search space (SS) configurations. A first SS configuration of the pair may indicate MO for use according to a format of the first DCI 304. A second SS configuration of the pair may indicate MO for use according to a format of the second DCI 306. In this first embodiment, the MO of the first SS configuration may occur with a periodicity that is the same as an MO of the second SS configuration. In these cases, it may accordingly be that the MO of the first SS configuration are offset from the MO of the second SS configuration by an offset value 308 that is known to the UE. In these cases, it may be that the UE only monitors for the second DCI 306 in the case that the first DCI 304 was first received during an MO of the first SS configuration (and, in some cases, in the case where the UE also sent the acknowledgement signaling 310), according to the offset value 308. Otherwise (if the MO of the first SS configuration does not have an M-DCI), the UE may not monitor for the second DCI 306 during a corresponding MO of the second SS configuration. This may minimize the UE power consumption, by avoiding unnecessarily monitoring the MO for the second DCI 306 if the first DCI 304 is not detected (and, in some cases, also acknowledged) in the corresponding MO of the first SS configuration.

In a second embodiment according to FIG. 3, the UE may be provided with a pair of SS configurations. A first SS configuration of the pair may indicate MO for use according to a format of the first DCI 304. A second SS configuration of the pair may indicate MO for use according to a format of the second DCI 306. In this second embodiment, it may be that the periodicities for the MO of the first SS configuration and the MO of the second SS configuration are not the same (or are at least not expressly known to be the same at the UE). In such cases, it may accordingly be that there is no offset value 308 describing generally a distance between the MO of the two different SS configurations. In these cases, the UE may detect the first DCI 304 by monitoring MO of the first SS configuration as before, and then determine that a corresponding MO to monitor on the second search space set for the second DCI 306 is a proximate (next in time) MO of the SS configuration set relative to a time of the MO for the detected first DCI 304. In this manner, not every MO of the second SS configuration needs to be monitored, avoiding unnecessary power consumption.

Figure 4:
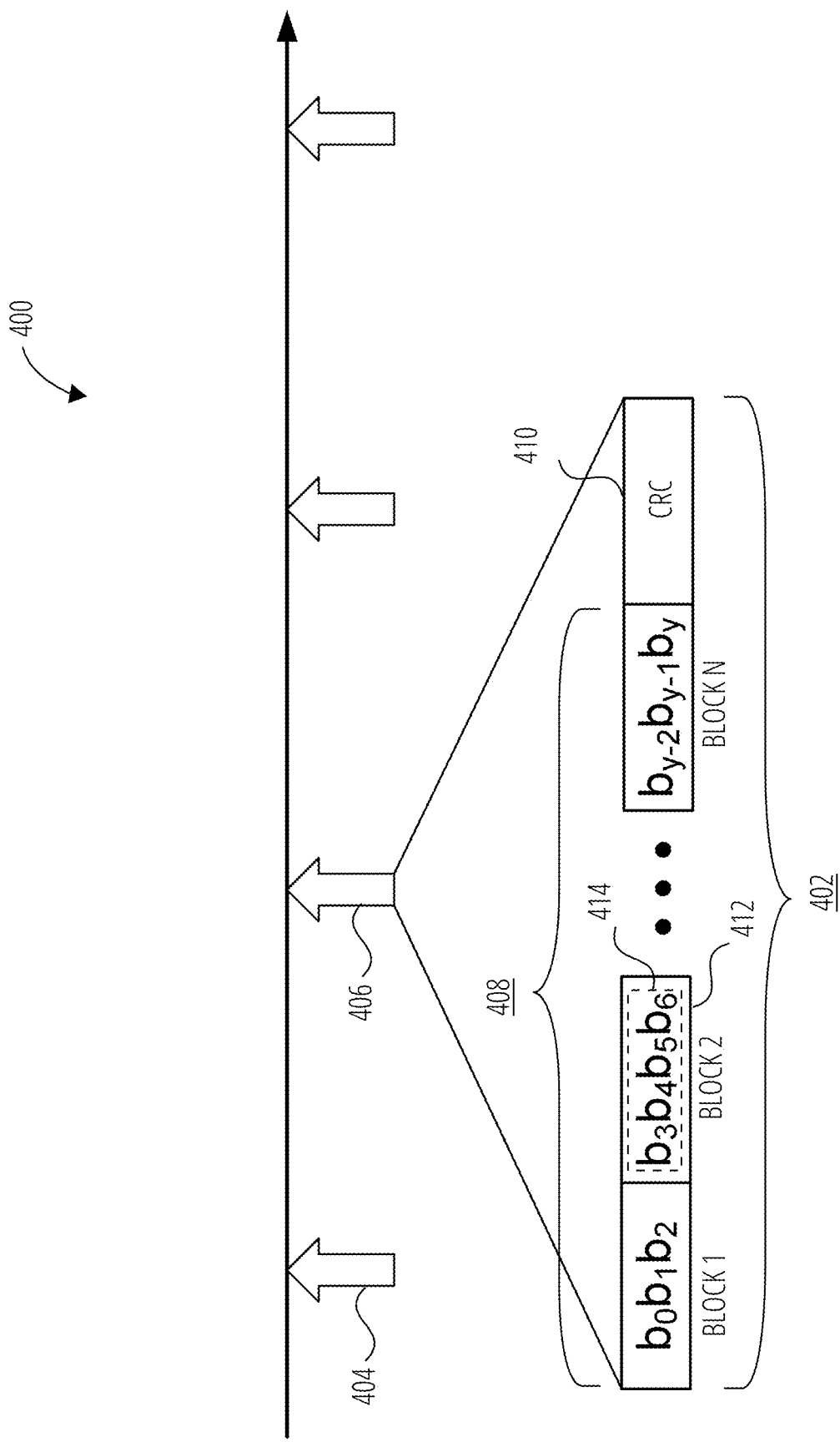
FIG. 4 illustrates a timeline for the use of a DCI that is used for acknowledgement signaling, and that shows the format of the DCI, according to an embodiment.

FIG. 4 illustrates a timeline 400 for the use of a DCI 402 that is used for acknowledgement signaling, and that shows the format of the DCI 402, according to an embodiment. The timeline 400 illustrates a first MO 404. The first MO 404 may be monitored at the UE. During this first MO 404, the UE detects M-DCI that schedules the use of a multi-PUSCH or a multi-PDSCH, in the manner described above. The first MO 404 may be an MO of a first SS configuration, according to an embodiment.

The timeline 400 then proceeds to the second MO 406. The UE may detect on this second MO 406 according to a different SS configuration from the first MO 404, in the manner described above. During the second MO 406, the UE detects the DCI 402.

The DCI 402 may be one example of a format that is introduced and used for confirmation of the multiple shared channel scheduling, as described herein. The DCI 402 may be an example of a "2-X" format DCI that can be used to carry confirmatory signaling for one or more UE that may receive the DCI 402 (e.g., the DCI 402 may be used without further change by multiple UE in similar manner as the UE described in relation to FIG. 4).

As illustrated, the DCI 402 may include a number of blocks 408 1 through N. Each of the blocks 408 may correspond to a UE for which the DCI 402 is intended for use. The starting position of a block of data for a particular UE may be determined by a block identification parameter that is known at the base station and provided to the UE configured to use that block by higher layers. In some embodiments, this parameter may be called a "startingBitOfFormat2X parameter." Accordingly, for the UE under discussion in FIG. 4, it may be that the UE has previously been configured with such a parameter so that it can identify which of the blocks 408 is its block.

Within each block, a confirmation bitmap may be found. The confirmation bitmap may include one or more bits corresponding to one or more CC being used by the UE for that block. Because each UE may be using a different number of CC, it is contemplated that the size of a block's confirmation bitmap may vary from block to block (as illustrated). The order of CC index (e.g., the index used by the base station and the UE to differentiate between CCs used by the UE) to bitmap mapping may be such that CC indices are mapped in ascending order from the most significant bit of the bitmap to the least significant bit of the bitmap.

For each bit of the bitmap, a value of "1" may indicate that a previously scheduled multi-PUSCH/multi-PDSCH remains scheduled (is confirmed) for use on that CC, and a value of "0" may indicate that a previously scheduled multi-PUSCH/multi-PDSCH is no longer scheduled (is cancelled) on that CC. In this manner, the DCI 402 carries confirmatory signaling for multiple shared channels to one or more UE.

It may be that the bitmap contains a bit for all CC used by a UE (whether or not a multiple shared channel use needs confirmed for that CC). In these cases, a CC for which a multiple shared channel use was not previously scheduled may simply indicate a "0" value. In other embodiments, the bitmap 414 may contain instead bits for only those CC for which a multiple shared channel scheduling needs confirmed or canceled.

To differentiate the format of the DCI 402 from other formats for DCI that may have the same size, a dedicated radio network temporary identifier (RNTI) may be configured and used to scramble the cyclic redundancy check (CRC) 410 of the DCI 402.

In the example of FIG. 4, it may be that the UE under discussion is configured with a block identification parameter that indicates that block 2 412 of the DCI 402 corresponds to the UE. Accordingly, the UE, upon detecting the DCI 402, identifies the location of block 2 412 and decodes the bitmap 414 from block 2 412. The bitmap 414 indicates either a "1" or a "0" for each of four CC used by the UE, in order of their CC indices. Accordingly, the UE uses (or not) previously scheduled multi-PUSCH/multi-PDSCH on these CC according to the bits of the bitmap 414.

It is contemplated that other DCI formats (e.g., other than the format of the DCI 402) may also be used to carry confirmatory signaling. In some cases, it may be that a DCI of a pre-existing format could be so used.

In some embodiments, a DCI of format 1-0 may be used for confirmation of multi-PUSCH/multi-PDSCH scheduling by a prior M-DCI. In some of these cases, a new RNTI value may be assigned to the UE for use to differentiate the format 1-0 DCI that is used for multiple shared channel confirmation from other DCI of format 1-0 used for other purposes.

In other cases, it may be that format 1-0 DCI for confirmatory signaling are limited to be transmitted to a UE in a SS configuration for the UE that is a UE-specific SS (USS) configuration (and that these are not understood by the UE to pertain to that UE if they happen to appear in a common SS (CSS) configuration used by the UE). In such cases, a new 1-bit flag field may be added to the format 1-0 DCI. In this new field, a value of "1" may indicate to the UE that the format 1-0 DCI is DCI carrying confirmatory signaling for previously scheduled multiple shared channels.

The format 1-0 DCI for confirmatory signaling may further include a confirmation bitmap for the UE. The confirmation bitmap may include one or more bits corresponding to one or more CC being used by the UE. The order of CC index (e.g., the index used by the base station and the UE to differentiate between CCs used by the UE) to bitmap mapping may be such that CC indices are mapped in ascending order from the most significant bit of the bitmap to the least significant bit of the bitmap.

For each bit of the bitmap, a value of "1" may indicate that a previously scheduled multi-PUSCH/multi-PDSCH remains scheduled (is confirmed) for use on that CC, and a value of "0" may indicate that a previously scheduled multi-PUSCH/multi-PDSCH is no longer scheduled (is cancelled) on that CC. In this manner, the format 1-0 carries confirmatory signaling for multiple shared channels to the UE.

It may be that the bitmap contains a bit for all CC used by a UE (whether or not a multiple shared channel use needs confirmed for that CC). In these cases, a CC for which a multiple shared channel use was not previously scheduled may simply indicate a "0" value. In other embodiments, the bitmap may contain instead bits for only those CC for which a multiple shared channel scheduling needs confirmed or canceled.

The format 1-0 DCI for confirmatory signaling may further include a HARQ process number that is set to the same value as a HARQ process number of the DCI that scheduled the multi-PUSCH/multi-PDSCH that is to be confirmed, so that the UE knows to proceed with their use.

In some embodiments, the format 1-0 DCI for confirmatory signaling may include a modulation and coding scheme (MCS) offset value that is used to update an MCS value that was provided to the UE by a DCI that scheduled the multi-PUSCH/multi-PDSCH that are being confirmed. This may be used in cases where, for example, a base station is aware that channel conditions have changed since the M-DCI scheduling the multi-PUSCH/multi-PDSCH was sent, and thus a corresponding change to the MCS level to be used with these is warranted. The offset value may be used at the UE to change the index used with an MCS table used by the UE to determine the MCS level with which the multi-PUSCH/multi-PDSCH are to be received/sent. This more up-to-date information may help the system be more efficient by allowing for a more temporally close setting or confirmation of the MCS level to use.

It may be that all other bits of the format 1-0 DCI used for confirmatory signaling in the manner described may be set to zero.

It is further contemplated that in embodiments using one of various DCI formats for confirmation of multi-PUSCH/multi-PDSCH scheduling by a prior M-DCI (including, but not limited to, embodiments using a format 1-0 DCI for such confirmatory signaling), it may be that the prior M-DCI contains an indication of one or more aggregation levels (AL) for use by the UE when monitoring for the DCI with the confirmatory signaling. In some of these cases, it may be that a set of AL for use in monitoring for the DCI with the confirmatory signaling are first configured to the UE by RRC signaling as part of search space configuration at the UE. Then, the one or more AL from this set that are to be used is dynamically signaled by the prior DCI. In a first case, assuming K possible aggregation levels, it may be that a field of $\log_2(K)$ bits is used to signal one of the AL for use. In a second case, it may be that a bitmap of length K is provided, and the bits thereof may be used to (individually) indicate for the use of one or more AL.

In some embodiments, it is contemplated that a prior M-DCI may further include an enablement field for indicating whether the UE should expect the base station to send the DCI with the confirmatory signaling. For example, it may be that in some cases, such as cell-center UEs with relatively higher reliability, an overhead of providing confirmatory signaling may not be efficient. For example, such UE may be understood to receive the M-DCI with a relatively high probability, and therefore may not be configured to respond with acknowledgement signaling (which saves overhead throughout the system). In such cases, it may also be determined, for example, that there is accordingly no need to send DCI with the confirmatory signaling (as it is merely assumed that the UE is going to proceed with the use of the multi-PUSCH/multi-PDSCH, and that in such a case the UE does not expect a response to the non-existent acknowledgment signaling and may not be otherwise configured to expect confirmatory signaling). The presence in the prior DCI of the enablement field may accordingly allow the base station to configure whether or not confirmatory signaling is used on a per-UE basis.

Figure 5:
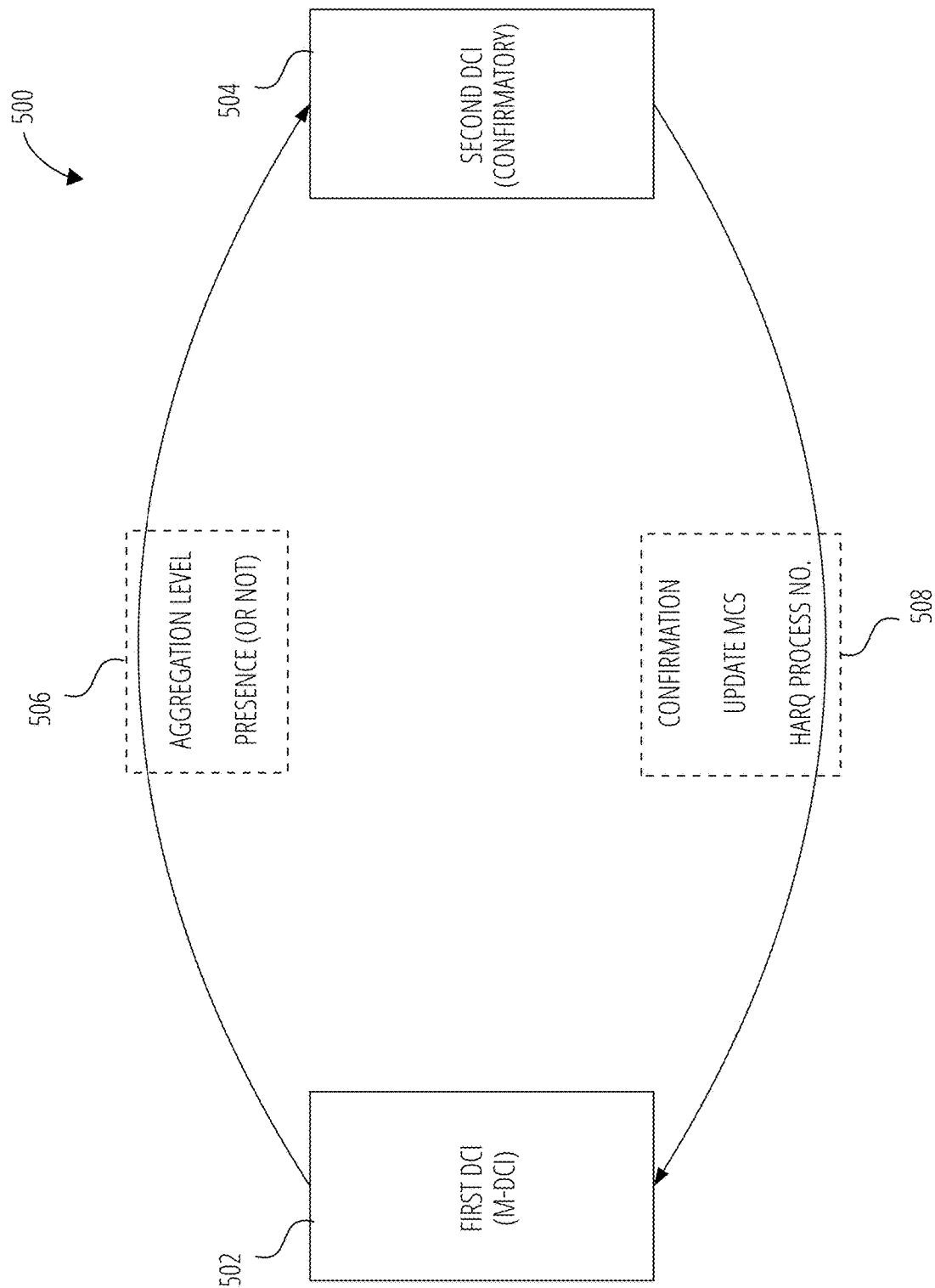
FIG. 5 shows a diagram showing potential interaction(s) between a first DCI that schedules the use of multiple shared channels and a second DCI that contains confirmatory signaling for the use of the multiple shared channels, according to various embodiments.

FIG. 5 shows a diagram 500 showing potential interaction(s) between a first DCI 502 that schedules the use of multiple shared channels and a second DCI 504 that contains confirmatory signaling for the use of the multiple shared channels, according to various embodiments. The first DCI 502 may be an M-DCI. As illustrated, the first DCI 502 may provide the first indication(s) 506 relative to the second DCI 504, which may include one or more of: one or more AL to be used when monitoring for the second DCI 504 and/or the presence (or not) of the second DCI 504 in the first instance. Further, the second DCI 504 may provide the second indication(s) 508 relative to the first DCI 502, which may include one or more of: confirmatory signaling (as discussed herein), an updated MCS for the multi-PUSCH/multi-PDSCH (e.g., by means of a provided offset value relative to an MCS index for the multi-PUSCH/multi-PDSCH provided in the first DCI 502), and/or a HARQ process number used by the first DCI 502.

In some embodiments, confirmation signaling corresponding to the multiple shared channels scheduled by an M-DCI may be provided in a PCICH. For example, it may be that such a PCICH as will be described can be implemented into fewer transmission resources than, for example, DCI for sending confirmatory signaling as previously described. In some cases (as will be shown), the PCICH may be transmitted using a single physical resource block (PRB).

Embodiments describing the use of PCICH herein may assume the initial sending by the base station of first DCI scheduling a multi-PUSCH/multi-PDSCH (e.g., a sending of M-DCI), and the (optional) receiving at the base station of acknowledgement signaling, as in embodiments previously discussed (and for the same reasons).

In some embodiments, one or more UE may be assigned to a PCICH group. To minimize signaling overhead, confirmatory signaling for each UE of the PCICH group may be mapped to the same resource element set (RES) of a PCICH. To maximize the use of time-frequency resources, the data for each UE of the PCICH group may be separated using different orthogonal covering codes (OCC).

The base station may determine a bit that corresponds to a confirmation (or not) of a multi-PUSCH/multi-PDSCH that has been scheduled for a CC on the UE. In some embodiments, the base station may repeat this bit (as will be shown). The base station may perform binary phase shift keying (BPSK) on each bit to generate corresponding BPSK symbols. These BPSK symbols may be denoted $z_j(i)=z_j(0)$, $z_j(1), \ldots, z_j(M_s-1)$, where i is the UE index and $M_s$ is the number of such BPSK symbols for a given UE before performing bit repetitions.

Each symbol of the sequence $z_j(i)$ is then symbol-wise multiplied with an OCC of length $N_{SF}$ corresponding to the associated UE having index j, resulting in an overall sequence of modulation symbols $d_j(0), d_j(1), \ldots, d_j(M_{symb}-1)$, where $M_{symb}=N_{SF}*M_S$. This sequence may be calculated according to $d_j(k)=\omega(k \mod N_{SF})*z_j(\lfloor k/N_{SF} \rfloor)$, where $\omega(k \mod N_{SF})$ are the elements of the OCC (of length $N_{SF}$) for the UE of index j used to spread the particular symbols $z_j(i)$ for the UE, and $0 \leq k \leq M_{symb}$.

The sequence of $d_j(k)$ in a PCICH for different UEs may therefore be understood as $d(k)=\Sigma d(k)$, where the sum is over all the UE in a RES in a PCICH, and $d_j(k)$ represent the symbols for the UE having index j.

The value of $N_{SF}$ may be configured by dedicated RRC signaling as part of PCICH resource configuration. Alternatively, the value of $N_{SF}$ may be pre-determined according to a specification with which the wireless communication system is compliant.

Table 1 provides an example of orthogonal sequences that can be so used when $N_{SF}=2$ (OCC-2) and $N_{SF}=4$ (OCC-4), allowing for the multiplexing of, respectively, 4 or 8 UE within a single PCICH group with signaling to be sent on a single PCICH. The sequence index $n_{seq}$ corresponds to a PCICH number (number of UE) within the PCICH group.

TABLE 1

| SEQUENCE INDEX $n_{seq}$ | ORTHOGONAL SEQUENCE, OCC-2 ($N_{SF}$ = 2) | ORTHOGONAL SEQUENCE, OCC-4 ($N_{SF}$ = 4) |
|---|---|---|
| \multicolumn{3}{l}{ORTHOGONAL SEQUENCES $\omega(0), \ldots, \omega(N_{SF} - 1)$} |
| 0 | [+1, +1] | [+1, +1, +1, +1] |
| 1 | [+1, −1] | [+1, −1, +1, −1] |
| 2 | [+j, +j] | [+1, +1, −1, −1] |
| 3 | [+j, −j] | [+1, −1, −1, +1] |
| 4 |  | [+j, +j, +j, +j] |
| 5 |  | [+j, −j, +j, −j] |
| 6 |  | [+j, +j, −j, −j] |
| 7 |  | [+j, −j, −j, +j] |

In one embodiment, UE may be divided into PCICH groups according based on a signal-to-noise and interference ratio (SINR) that is experienced by the UE. For example, UE with relatively higher SINR (e.g., a cell-center UE) may be assigned to a PCICH group using $N_{SF}=4$ to minimize overall signaling overhead for confirmation signaling (by placing relatively more UE in the PCICH group). Alternatively, a UE with a relatively lower SINR (e.g., a cell edge UE) may be assigned to a PCICH group using $N_{SF}=2$ to increase the number of repetitions of the modulated symbols of the PCICH group (as will be shown), thereby increasing symbol detection performance (at the cost of having relatively fewer UE in the PCICH group).

Figure 6:
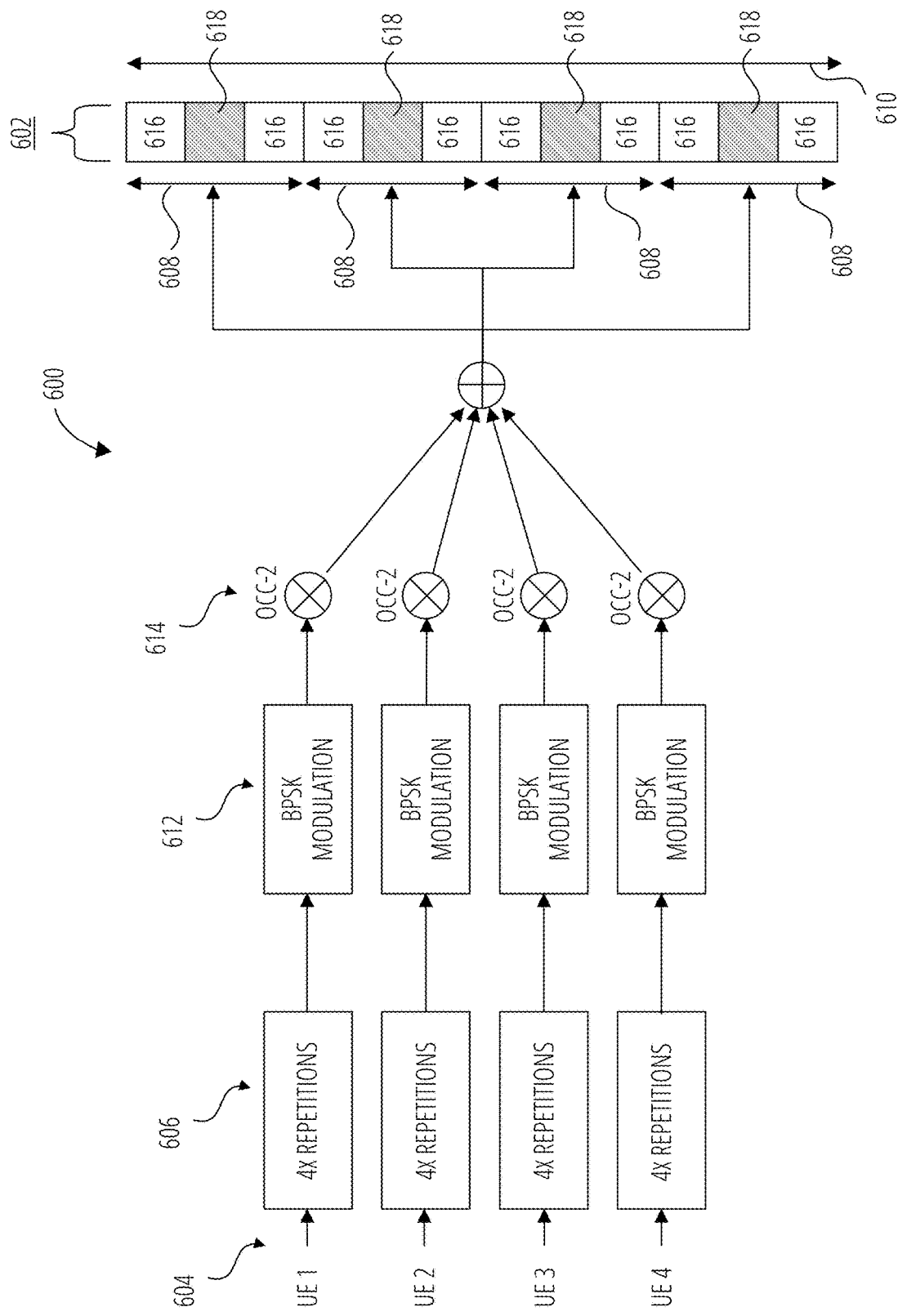
FIG. 6 shows a diagram illustrating the formation of a PCICH using OCC-2 ($N_{SF}$=2), according to an embodiment.

FIG. 6 shows a diagram 600 illustrating the formation of a PCICH 602 using OCC-2 ($N_{SF}=2$), according to an embodiment. The PCICH 602 may be sent on a single PRB 610, and may be divided into multiple RES 608. Further, as illustrated, the PCICH 602 may be made up of available resource elements 616 and unavailable resource elements 618 (which are spread among the RES 608, as illustrated). The unavailable resource elements 618 may not be used for carrying confirmation signaling directly, but may instead be pre-established in the PCICH 602 carried on the PRB 610 for other uses (such as for PCICH demodulation reference signals (DMRS)).

Each of the UE 604 may be part of a PCICH group that uses the PCICH 602. At the base station, a single bit is generated for each of the UE 604, indicating whether, for that UE, a previously scheduled multi-PUSCH/multi-PDSCH is still to be used by the base station (e.g., whether it has been canceled). Each such bit may undergo a number of repetitions. In the diagram 600, the repetition count 606 illustrates that each such bit is repeated four times. This corresponds to the number of the RES 608 (four) that can be included in the single PRB 610 on which the PCICH 602 is sent. The number of RES 608 on the PRB 610 may be determined by the size of each RES 608. The size of an RES 608 may be determined in turn according to the $N_{SF}$ value in use. For example, because the diagram 600 illustrates the use of OCC-2 sequences 614 (meaning $N_{SF}=2$), each RES 608 is configured/sized such that it contains two available resource elements 616.

As shown, each (repeated) bit undergoes BPSK modulation 612 to generate a symbol for that bit. Then, that symbol is spread according to an associated one of the OCC-2 sequences 614, which results in a total of two symbols (consistent with $N_{SF}=2$). These two symbols (for each UE) are mapped to one of the two available resource elements 616 on an RES 608 of the PCICH 602.

Note that due to the repetition count 606 of four, the use of this arrangement with four repeated bits makes it possible to perform this process for each of the four RES 608.

Figure 7:
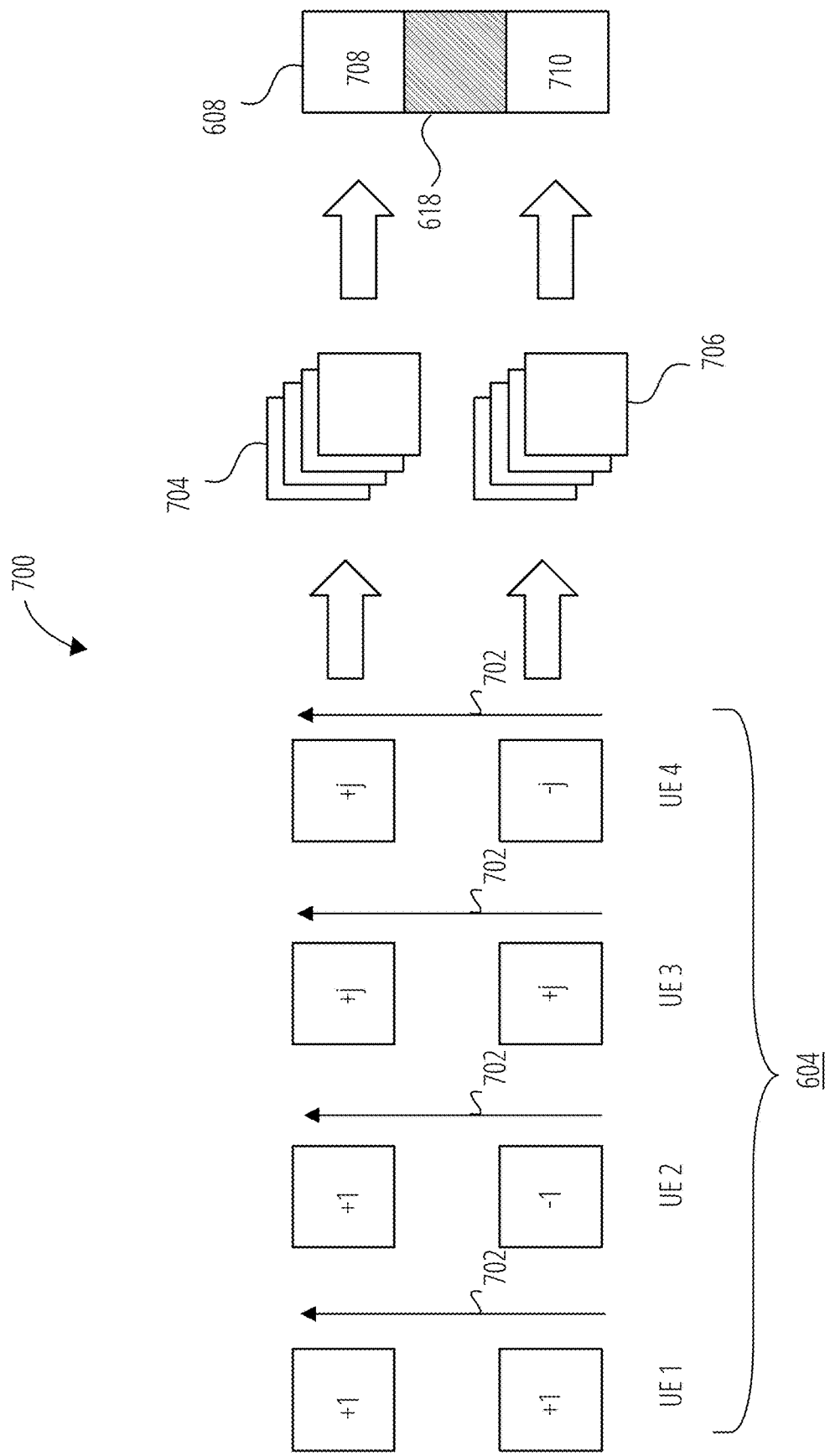
FIG. 7 illustrates the construction of an RES of a PCICH, according to an embodiment.

FIG. 7 illustrates the construction 700 of an RES 608 of a PCICH, according to an embodiment. The RES 608 may be according to an RES 608 of FIG. 6.

As shown, a symbol for each of the UE 604 (e.g., a BPSK symbol corresponding to a bit generated for each of the UE 604) is spread 702 according to a unique OCC-2 sequence, generating two associated spreaded symbols. A first spreaded symbol set 704 (comprising one spreaded symbol for each UE 604) is then mapped onto a first available resource element 708 for the RES 608 (where the first available resource element 708 corresponds to one of the available resource elements 616 of a first RES 608 of FIG. 6). A second spreaded symbol set 706 (comprising the other spreaded symbol for each UE 604) is then mapped onto a second available resource element 710 for the RES 608

(where the second available resource element 710 corresponds to the other of the available resource elements 616 of the first RES 608 of FIG. 6).

Returning to FIG. 6, it can be seen that up to four such RES 608 can be placed into a single PRB 610 to be transmitted as the PCICH 602. The UE may then decode one (or more) of the RES 608 according to the orthogonal codes in order to differentiate confirmation signaling for each of the UE 604.

While the example of FIG. 6 has shown the mapping of four UE 604 on a single PRB 610 of a PCICH 602 according to OCC-2, it is contemplated that more than four UE could be used with OCC-4, with the method repeating according to groups of four (or fewer) UE, and the resulting PCICH comprising multiple PRB (one per group).

Figure 8:
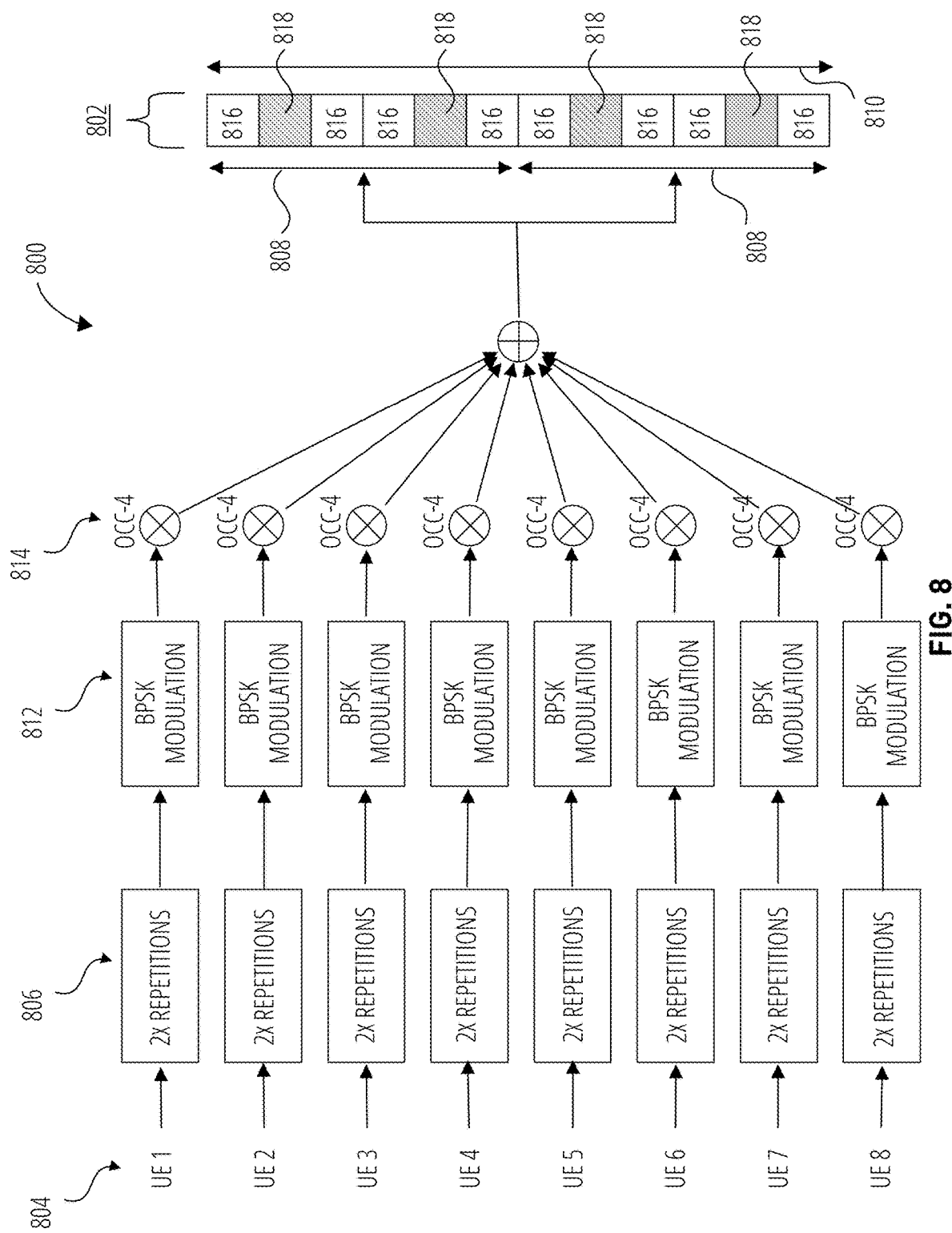
FIG. 8 shows a diagram illustrating the formation of a PCICH using OCC-4 ($N_{SF}$=4), according to an embodiment.

FIG. 8 shows a diagram 800 illustrating the formation of a PCICH 802 using OCC-4 ($N_{SF}$=4), according to an embodiment. The PCICH 802 may be sent on a single PRB 810, and may be divided into multiple RES 808. Further, as illustrated, the PCICH 802 may be made up of available resource elements 816 and unavailable resource elements 818 (which are spread among the RES 808, as illustrated). The unavailable resource elements 818 may not be used for carrying confirmation signaling directly, but may instead be pre-established in the PCICH 802 carried on the PRB 810 for other uses (such as for PCICH demodulation reference signals (DMRS)).

Each of the UE 804 may be part of a PCICH group that uses the PCICH 802. At the base station, a single bit is generated for each of the UE 804, indicating whether, for that UE, a previously scheduled multi-PUSCH/multi-PDSCH is still to be used by the base station (e.g., whether it has been canceled). Each such bit may undergo a number of repetitions. In the diagram 800, the repetition count 806 illustrates that each such bit is repeated two times. This corresponds to the number of the RES 808 (two) that can be included in the single PRB 810 on which the PCICH 802 is sent. The number of RES 808 on the PRB 810 may be determined by the size of each RES 808. The size of an RES 808 may be determined in turn according to the $N_{SF}$ value in use. For example, because the diagram 800 illustrates the use of OCC-4 sequences 814 (meaning $N_{SF}$=4), each RES 808 is configured/sized such that it contains four available resource elements 816.

As shown, each (repeated) bit undergoes BPSK modulation 812 to generate a symbol for that bit. Then, that symbol is spread according to an associated one of the OCC-4 sequences 814, which results in a total of four symbols (consistent with $N_{SF}$=4). These four symbols (for each UE) are mapped to one of the four available resource elements 816 on an RES 808 of the PCICH 802.

Note that due to the repetition count 806 of two, the use of this arrangement with two repeated bits makes it possible to perform this process for each of the two RES 808.

Figure 9:
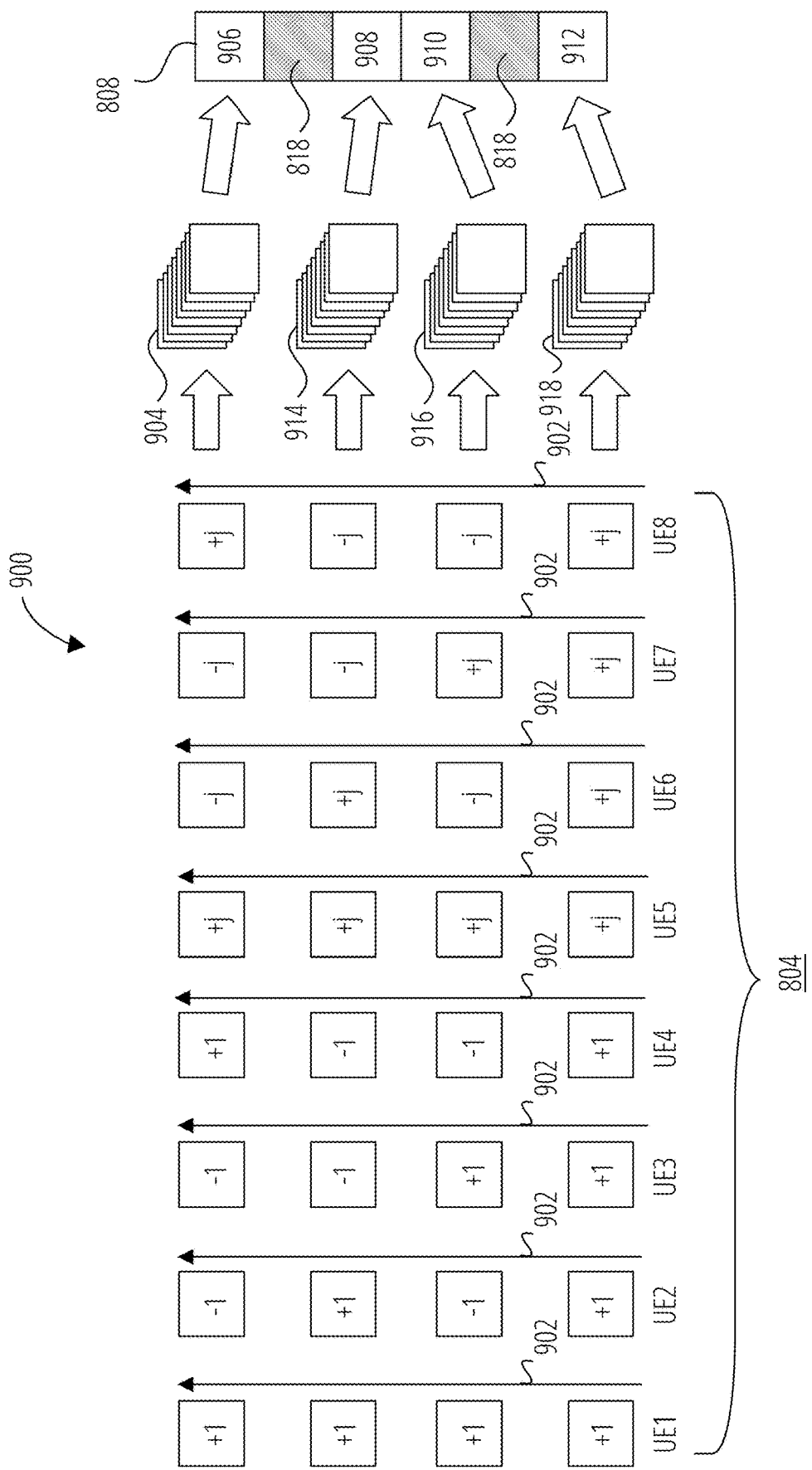
FIG. 9 illustrates the construction of an RES of a PCICH, according to an embodiment.

FIG. 9 illustrates the construction 900 of an RES 808 of a PCICH, according to an embodiment. The RES 808 may be according to an RES 808 of FIG. 8.

As shown, a symbol for each of the UE 804 (e.g., a BPSK symbol corresponding to a bit generated for each of the UE 804) is spread 902 according to a unique OCC-4 sequence, generating four associated spreaded symbols. A first spreaded symbol set 904 (comprising one spreaded symbol for each UE 804) is then mapped onto a first available resource element 906 for the RES 808 (where the first available resource element 906 corresponds to a first of the available resource elements 816 of a first RES 808 of FIG. 8). A second spreaded symbol set 914 (comprising a second spreaded symbol for each UE 804) is then mapped onto a second available resource element 908 for the RES 808 (where the second available resource element 908 corresponds to a second of the available resource elements 816 of the first RES 808 of FIG. 8). A third spreaded symbol set 916 (comprising a third spreaded symbol for each UE 804) is then mapped onto a third available resource element 910 for the RES 808 (where the third available resource element 910 corresponds to a third of the available resource elements 816 of the first RES 808 of FIG. 8). A fourth spreaded symbol set 918 (comprising a fourth spreaded symbol for each UE 804) is then mapped onto a fourth available resource element 912 for the RES 808 (where the fourth available resource element 912 corresponds to a fourth of the available resource elements 816 of the first RES 808 of FIG. 8).

Returning to FIG. 8, it can be seen that up to two such RES 808 can be placed into a single PRB 810 to be transmitted as the PCICH 802. The UE may then decode one (or more) of the RES 808 according to the orthogonal codes in order to differentiate confirmation signaling for each of the UE 804.

While the example of FIG. 8 has shown the mapping of eight UE 804 on a single PRB 810 of a PCICH 802 according to OCC-4, it is contemplated that more than eight UE could be used with OCC-4, with the method repeating according to groups of eight (or fewer) UE, and the resulting PCICH comprising multiple PRB (one per group).

As compared to the PCICH 602 of FIG. 6, the PCICH 802 of FIG. 8 has a doubled capability, in that it can report on up to eight UE (instead of four). However, the repetition number of the data sent is decreased by half to two (instead of four repetitions, as in the PCICH 602 of FIG. 6.) Accordingly, it may be that the PCICH 602 of FIG. 6 is used for UE with lower SINR geometry (so that the additional repetitions can be leveraged in that case) and that the PCICH 802 of FIG. 6 is used for UE with higher SINR geometry (so that additional UE may be reported on), as described above.

In whatever embodiment, the UE may assume the DMRS for PCICH is mapped to resource element k within an RES. It may be that for OCC-2, k=1, and for OCC-4, k=1, 4.

The UE may assume the PCICH DMRS are quasi co-located (QCL) with an M-DCI that schedules the multi-PUSCH/multi-PDSCH with respect to one or more of Doppler shift, Doppler spread, average delay, delay spread, and, where applicable, spatial Rx parameters.

An RES of a PCICH may be mapped to resources within a core resource set (CORESET) for transmission to the UE in a known manner. Conceptually, the RES/PRB of the PCICH as discussed in relation to FIG. 6 and FIG. 8 may be understood in a virtualized manner, such that they can (optionally) be broken up, and then and placed on one or more (actual) PRB of the CORESET, in the manner that will be shown.

One or more entire PCICH as discussed in relation to FIG. 6 and FIG. 8 may be mapped to one or more PRB in the CORESET according to the RES of the PCICH. The process of mapping the RES of that PCICH to the actual PRB of the CORESET may be called RES-to-PRB mapping. In non-interleaved RES-to-PRB mapping, this mapping may keep the RES of that PCICH together. In interleaved RES-to-PRB mapping, RES of a PCICH may be spread over multiple and/or non-consecutive PRBs of the CORESET.

After such RES-to-PRB mapping, PCICH resources for a particular UE within a core resource set (CORESET) may be identified using an index pair ($n_{startingPRB}$, $n_{seq}$) where $n_{startingPRB}$ is the PRB index of the first PRB number within the CORESET that has the PCICH and $n_{seq}$ corresponds to the orthogonal sequence index for the orthogonal sequence used to spread data from the particular UE. Table 1 (previously discussed) illustrates, for example, $n_{seq}$ possibilities for OCC-2 and OCC-4 as these values correspond to an applicable orthogonal sequence. In some embodiments, $n_{startingPRB}$ and $n_{seq}$ are provided by the base station to the particular UE. The UE may then use the $n_{startingPRB}$ to determine the location of the first PRB number within the CORESET that has the PCICH for the PCICH group to which the UE belongs, in the manner that will be shown. In addition, the $n_{seq}$ configuration may be used at the UE to determine the OCC sequence that associated to the UE that was used at the base station when generating the PCICH (e.g., when generating the RES of the PCICH, as described above), and which accordingly should be used to de-spread and decode information for the UE from the PCICH (e.g., from one or more RES of the PCICH).

Accordingly, it may be understood that the CORESET may be used to transmit the PCICH (e.g., based on units of RES bundles of the PCICH, as will be described) as well as PDCCH (e.g., based on resource element group (REG) bundle units), using different resources in the frequency domain (e.g., different PRB).

In some examples used herein, RES bundles of a PCICH each comprising one or more RES of the PCICH may be used. For example, in the case of OCC-2 and a PCICH having four RES (as in FIG. 6), a first RES bundle (e.g., an RES bundle #0) may include a first RES (e.g., an RES #0) and a second RES (e.g., an RES #1) of the four RES of the PCICH, and a second RES bundle (e.g., an RES bundle #1) may include a third RES (e.g., an RES #2) and a fourth RES (e.g., an RES #3) of the four RES of the PCICH. As another example, in the case of OCC-4 and a PCICH having two RES, a first RES bundle (e.g., an RES bundle #0) may include a first RES (e.g., an RES #0) of the two RES of the PCICH, and a second RES bundle (e.g., an RES bundle #1) may include a second RES (e.g., an RES #1) of the two RES of the PCICH. Other bundle configurations (with differing numbers of RES) are contemplated. RES-to-PRB mapping may occur in terms of RES bundles, as will be shown.

A first embodiment for RES-to-PRB mapping may use non-interleaved RES-to-PRB mapping. In these embodiments, the RES of a PCICH are placed within N consecutive PRB on the CORESET. In some designs, N=1 is used, and this may be consistent with a specification for the wireless communication system (which may generally enforce that the PCICH fit on a single PRB).

Figure 10:
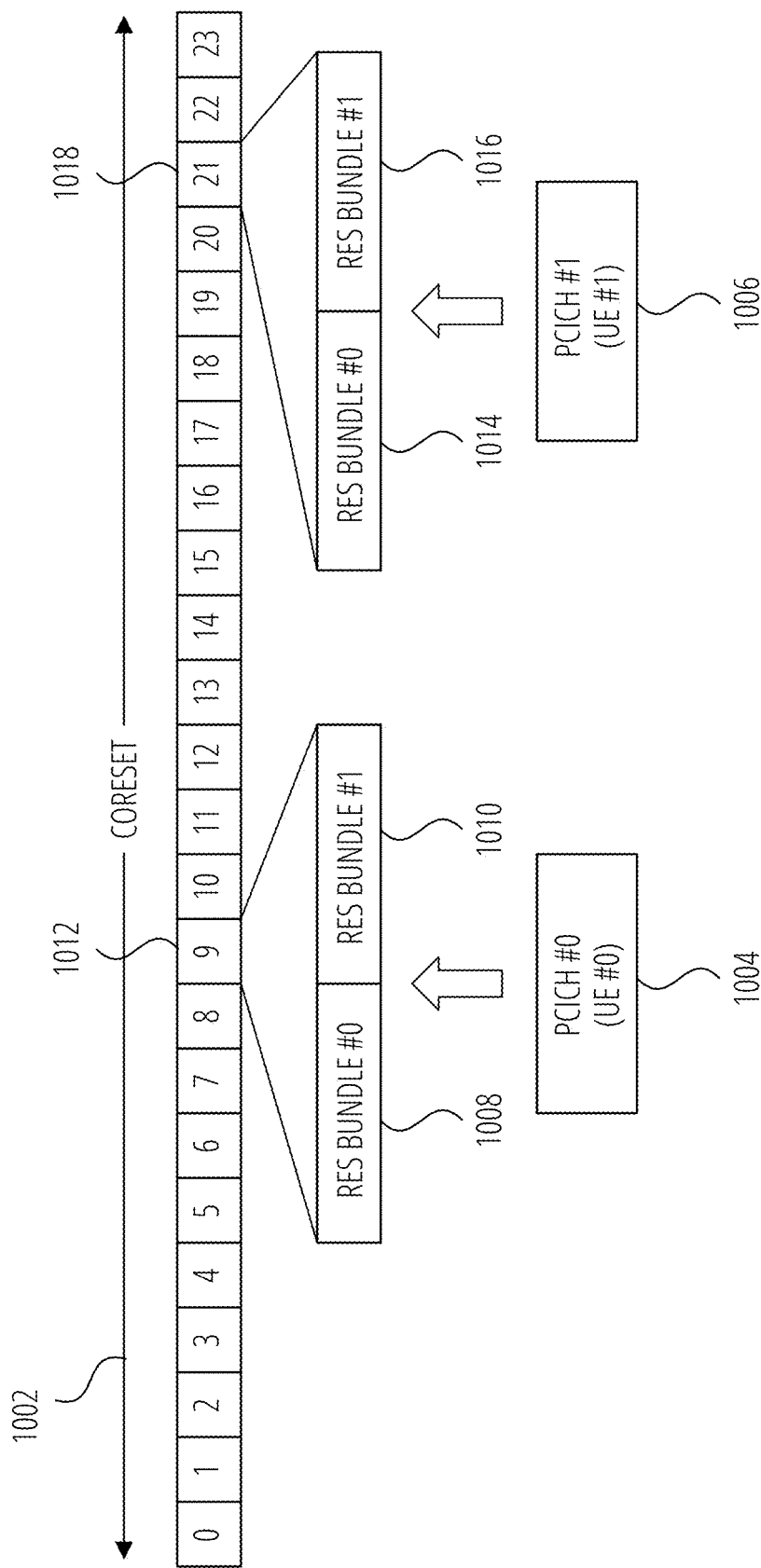
FIG. 10 illustrates a CORESET with which non-interleaved RES-to-PRB mapping is used, according to an embodiment.

FIG. 10 illustrates a CORESET 1002 with which non-interleaved RES-to-PRB mapping is used, according to an embodiment. The CORESET 1002 may have a number of PRB ($N_{REG}^{CORESET}$) of 24, as illustrated.

The CORESET 1002 may include a first PCICH 1004 containing confirmatory signaling for (at least) a UE of a first PCICH group (UE #0 as illustrated) and a second PCICH 1006 containing confirmatory signaling for (at least) a UE of a second PCICH group (UE #1 as illustrated). An $n_{startingPRB}$ for the first PCICH 1004 may be 9, and an $n_{startingPRB}$ for the second PCICH 1006 may be 21.

In this case, the first PCICH 1004 and the second PCICH 1006 may each comprise a pair of RES bundles, as described above. According to the non-interleaved RES-to-PRB mapping, a first RES bundle 1008 and a second RES bundle 1010 of the first PCICH 1004 are mapped to a first PRB 1012 of the CORESET 1002 (e.g., according to $n_{startingPRB}$=9 for the first PCICH 1004). Further, a first RES bundle 1014 and a second RES bundle 1016 of a second PCICH 1006 are mapped to a second PRB 1018 of the CORESET 1002 (e.g., according to $n_{startingPRB}$=21 for the second PCICH).

Other embodiments for RES-to-PRB mapping may use interleaved RES-to-PRB mapping. This design may help to efficiently multiplex PCICH with PDCCH using control channel element (CCE)-to-REG resource mapping within a single CORESET resource.

In interleaved RES-to-PRB mapping embodiments, the PRB of the CORESET having a first RES bundle of a PCICH may be identified according to $n_{startingPRB}$ as described above. A second PRB index $n_{secondPRB}$ for a PRB of the CORESET having the second RES bundle of the PCICH may be determined according to a value R configured for the same CORESET that is using interleaved CCE-to-REG mappings and where the PCICH is also used, where $n_{secondPRB}=n_{startingPRB}+N_{REG}^{CORESET}/R$. The UE may use the $n_{secondPRB}$ to determine the location of a second PRB having (part of) the PCICH.

In some embodiments, R may be configured by RRC signaling for a CORESET with interleaved CCE-to-REG mappings for PDCCH transmission. In some embodiments, $R \in \{2, 3, 6\}$. In some embodiments, a specification defining the operation of the wireless communication system may impose R=2 for CORESET having PCICH.

In some embodiments using interleaved RES-to-PRB mapping, once the (multiple) PRB of the CORESET are determined as above, a bundle index value B may be generated according to a portion of the relevant PRB on which the RES of the corresponding PCICH are found. This bundle index value B may be provided to the UE by RRC signaling as part of PCICH channel configuration by the base station.

Figure 11:
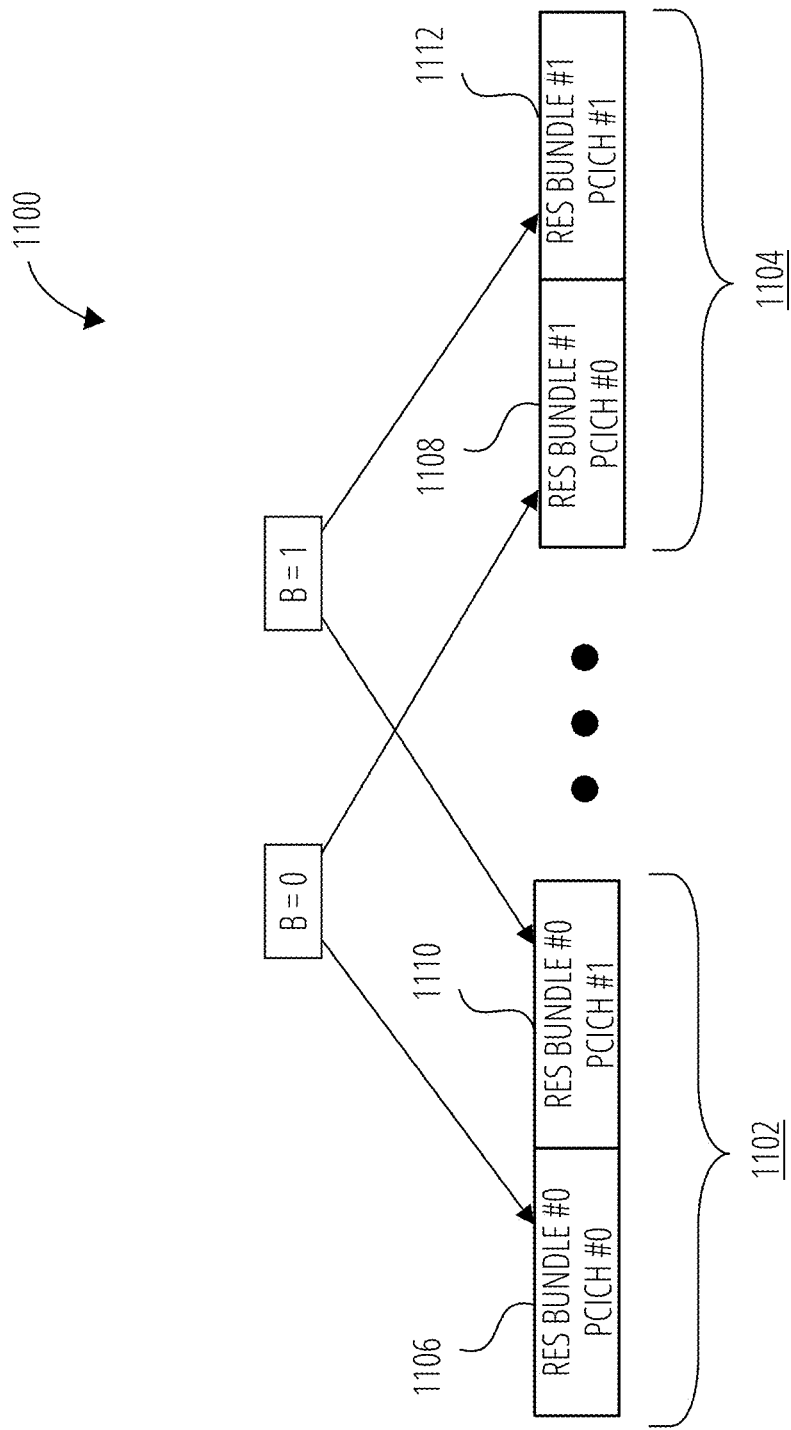
FIG. 11 illustrates interleaved RES-to-PRB mapping using a bundle index value B, according to embodiments disclosed herein.

FIG. 11 illustrates interleaved RES-to-PRB mapping 1100 using a bundle index value B, according to embodiments disclosed herein. The RES-to-PRB mapping 1100 uses a first PRB 1102 and a second PRB 1104 of a CORESET. The first PRB 1102 may correspond to $n_{startingPRB}$, and the second PRB 1104 may correspond to $n_{secondPRB}$, in the manner described above.

In this case, a first PCICH (corresponding to PCICH #0 as illustrated) and a second PCICH (corresponding to PCICH as illustrated) may each comprise a pair of RES b1mdles, as described above. As illustrated, a PCICH for which B=0 (corresponding to PCICH #0) may have its first RES bundle placed in a first location 1106 in the first PRB 1102 and may have its second RES bundle placed in a first location 1108 of the second PRB 1104, with the use of the first location 1106 and the first location 1108 corresponding to B=0. Further a PCICH for which B=1 (corresponding to PCICH #1) may have its first RES bundle placed in a second location 1110 in the first PRB 1102 and may have its second RES bundle placed in a second location 1112 of the second PRB 1104, with the use of the second location 1110 and the second location 1112 corresponding to B=1.

Figure 12:
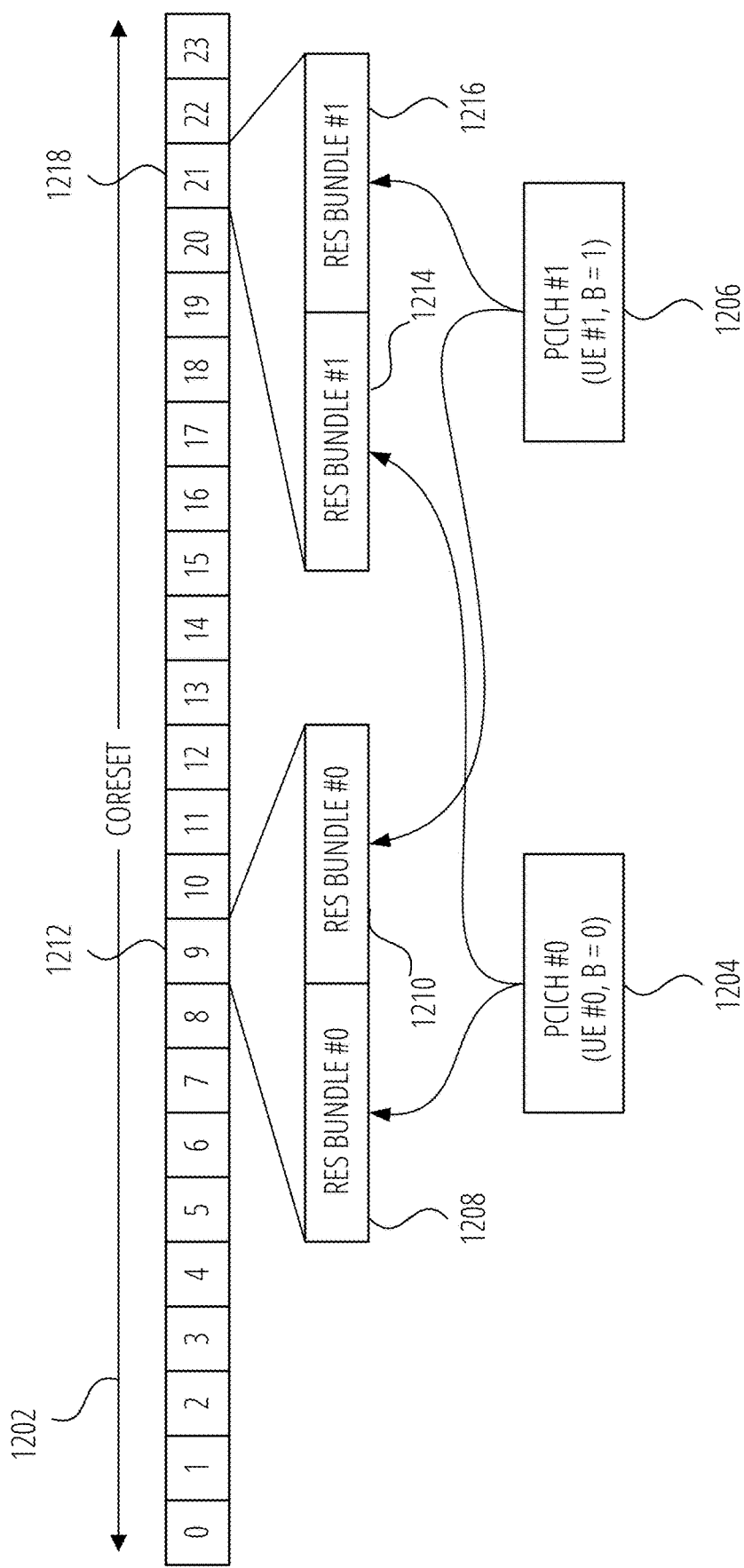
FIG. 12 illustrates a CORESET with which interleaved RES-to-PRB mapping is used, according to an embodiment.

FIG. 12 illustrates a CORESET 1202 with which interleaved RES-to-PRB mapping is used, according to an embodiment. The CORESET 1002 may correspond to an $N_{REG}^{CORESET}$ of 24, as illustrated. Further, a resource element group (REG) bundle size for PDDCH mapping as configured by RRC signaling (L) may be 3.

The CORESET 1202 may include a first PCICH 1204 containing confirmatory signaling for (at least) a UE of a first PCICH group (UE #0 as illustrated) and a second PCICH 1206 containing confirmatory signaling for (at least) a UE of a second PCICH group (UE #1 as illustrated). An $n_{startingPRB}$ for each of the first PCICH 1204 and the second PCICH 1206 may be 9.

It may further be that in the embodiment shown in FIG. 12, R=2. Accordingly, $n_{secondPRB}=n_{startingPRB}+N_{REG}^{CORESET}/R$ gives $n_{secondPRB}=9+24/2=21$ for each of the first PCICH 1204 and the second PCICH 1206.

In this case, the first PCICH 1204 and the second PCICH 1206 may each comprise a pair of RES bundles, as described above. According to the interleaved RES-to-PRB mapping, a first RES bundle 1208 for the first PCICH 1204 and a first RES bundle 1210 of the second PCICH 1206 are mapped to a first PRB 1212 of the CORESET 1202. This mapping may occur according to an $n_{startingPRB}=9$ for each of the first PCICH 1204 and the second PCICH 1206, and where B=0 for the first PCICH 1204 and B=1 for the second PCICH 1206 (with the B values controlling the ordering of the first RES bundle 1208 of the first PCICH 1204 and the first RES bundle 1210 of the second PCICH 1206 within the first PRB 1212 in the manner previously described).

Further, a second RES bundle 1214 for the first PCICH 1204 and a second RES bundle 1216 of the second PCICH 1206 are mapped to a second PRB 1218 of the CORESET 1202. This mapping may occur according to an $n_{secondPRB}=21$ (as calculated above) for each of the first PCICH 1204 and the second PCICH 1206, and where B=0 for the first PCICH 1204 and B=1 for the second PCICH 1206 (with the B values controlling the ordering of the second RES bundle 1214 of the first PCICH 1204 and the second RES bundle 1216 of the second PCICH 1206 within the second PRB 1218 in the manner previously described).

Figure 13:
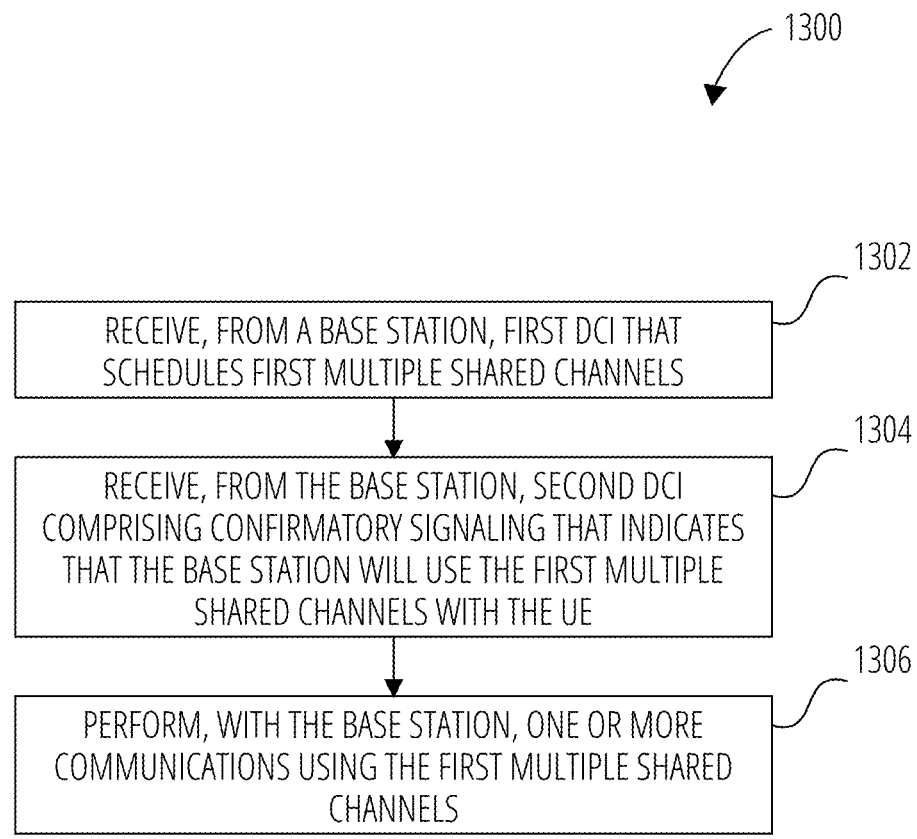
FIG. 13 illustrates a method of a UE, according to an embodiment.

FIG. 13 illustrates a method 1300 of a UE, according to an embodiment. The method 1300 includes receiving 1302, from a base station, first DCI that schedules first multiple shared channels.

The method 1300 further includes receiving 1304, from the base station, second DCI comprising confirmatory signaling that indicates that the base station will use the first multiple shared channels with the UE.

The method 1300 further includes performing 1306, with the base station, one or more communications using the first multiple shared channels.

In some embodiments of the method 1300, the first multiple shared channels comprise one of multi-PUSCH and multi-PDSCH.

In some embodiments of the method 1300, the first DCI is received during a first MO of a first SS configuration at the UE, and the second DCI is received during a second MO of a second SS configuration at the UE. In some of these embodiments, the UE determines that the second MO is a proximate MO of the second SS configuration relative to a time of first MO.

In some embodiments of the method 1300, the second DCI is for a plurality of UE that includes the UE and comprises a block of data associated with the first UE that comprises the confirmatory signaling. In some of these embodiments, the block of data is located within the second DCI by the UE according to a starting position parameter provided to the UE by the base station.

In some embodiments of the method 1300, the method 1300 also includes identifying the second DCI as containing the confirmatory signaling using a RNTI corresponding to the second DCI.

In some embodiments of the method 1300, the method 1300 also includes identifying the second DCI as containing the confirmatory signaling based on an indication found in the second DCI that it comprises the confirmatory signaling.

In some embodiments of the method 1300, the first multiple shared channels are scheduled on a first CC used by the UE, and the confirmatory signaling comprises a bitmap comprising a first bit corresponding to the first CC that indicates that the base station will use the first multiple shared channels. In some of these embodiments, the first DCI further schedules second multiple shared channels on a second CC used by the UE, and the bitmap further comprises a second bit corresponding to the second CC that indicates that the base station will not use the second multiple shared channels. In some of these embodiments, the confirmatory signaling further comprises a second bit corresponding to a second CC; and the first bit and the second bit are ordered within the bitmap in an ascending CC index order.

In some embodiments of the method 1300, the first DCI indicates that the second DCI will be sent.

In some embodiments of the method 1300, the first DCI comprises a HARQ process number, and the second DCI comprises the HARQ process number.

In some embodiments of the method 1300, the second DCI updates a modulation and coding scheme (MCS) used by the UE that was indicated in the first DCI.

Embodiments contemplated herein include an apparatus comprising means to perform one or more elements of the method 1300. This apparatus may be, for example, an apparatus of a UE (such as a wireless device 1802 that is a UE, as described herein).

Embodiments contemplated herein include one or more non-transitory computer-readable media comprising instructions to cause an electronic device, upon execution of the instructions by one or more processors of the electronic device, to perform one or more elements of the method 1300. This non-transitory computer-readable media may be, for example, a memory of a UE (such as a memory 1806 of a wireless device 1802 that is a UE, as described herein).

Embodiments contemplated herein include an apparatus comprising logic, modules, or circuitry to perform one or more elements of the method 1300. This apparatus may be, for example, an apparatus of a UE (such as a wireless device 1802 that is a UE, as described herein).

Embodiments contemplated herein include an apparatus comprising: one or more processors and one or more computer-readable media comprising instructions that, when executed by the one or more processors, cause the one or more processors to perform one or more elements of the method 1300. This apparatus may be, for example, an apparatus of a UE (such as a wireless device 1802 that is a UE, as described herein).

Embodiments contemplated herein include a signal as described in or related to one or more elements of the method 1300.

Embodiments contemplated herein include a computer program or computer program product comprising instructions, wherein execution of the program by a processor is to cause the processor to carry out one or more elements of the method 1300. The processor may be a processor of a UE (such as a processor(s) 1804 of a wireless device 1802 that is a UE, as described herein). These instructions may be, for example, located in the processor and/or on a memory of the UE (such as a memory 1806 of a wireless device 1802 that is a UE, as described herein).

Figure 14:
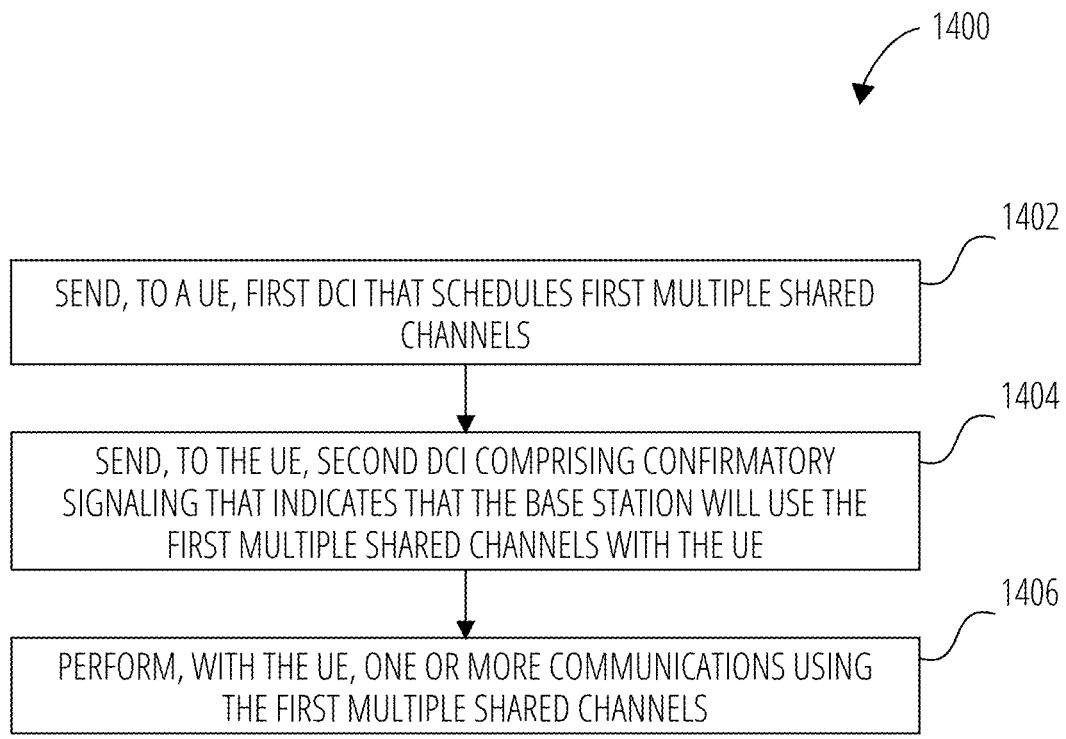
FIG. 14 illustrates a method of a base station, according to an embodiment.

FIG. 14 illustrates a method 1400 of a base station, according to an embodiment. The method 1400 includes sending 1402, to a UE, first DCI that schedules first multiple shared channels.

The method 1400 further includes sending 1404, to the UE, second DCI comprising confirmatory signaling that indicates that the base station will use the first multiple shared channels with the UE.

The method 1400 further includes performing 1406, with the UE, one or more communications using the first multiple shared channels.

In some embodiments of the method 1400, the second DCI is for a plurality of UE that comprises the UE and comprises a block of data associated with the UE that comprises the confirmatory signaling.

In some embodiments of the method 1400, the first multiple shared channels are scheduled on a first component carrier (CC) used by the UE, and the confirmatory signaling comprises a bitmap comprising a first bit corresponding to the first CC that indicates that the base station will use the first multiple shared channels. In some of these embodiments, the first DCI further schedules second multiple shared channels on a second CC used by the UE, and the bitmap further comprises a second bit corresponding to the second CC that indicates that the base station will not use the second multiple shared channels.

Embodiments contemplated herein include an apparatus comprising means to perform one or more elements of the method 1400. This apparatus may be, for example, an apparatus of a base station (such as a network device 1818 that is a base station, as described herein).

Embodiments contemplated herein include one or more non-transitory computer-readable media comprising instructions to cause an electronic device, upon execution of the instructions by one or more processors of the electronic device, to perform one or more elements of the method 1400. This non-transitory computer-readable media may be, for example, a memory of a base station (such as a memory 1822 of a network device 1818 that is a base station, as described herein).

Embodiments contemplated herein include an apparatus comprising logic, modules, or circuitry to perform one or more elements of the method 1400. This apparatus may be, for example, an apparatus of a base station (such as a network device 1818 that is a base station, as described herein).

Embodiments contemplated herein include an apparatus comprising: one or more processors and one or more computer-readable media comprising instructions that, when executed by the one or more processors, cause the one or more processors to perform one or more elements of the method 1400. This apparatus may be, for example, an apparatus of a base station (such as a network device 1818 that is a base station, as described herein).

Embodiments contemplated herein include a signal as described in or related to one or more elements of the method 1400.

Embodiments contemplated herein include a computer program or computer program product comprising instructions, wherein execution of the program by a processing element is to cause the processing element to carry out one or more elements of the method 1400. The processor may be a processor of a base station (such as a processor(s) 1820 of a network device 1818 that is a base station, as described herein). These instructions may be, for example, located in the processor and/or on a memory of the base station (such as a memory 1822 of a network device 1818 that is a base station, as described herein).

Figure 15:
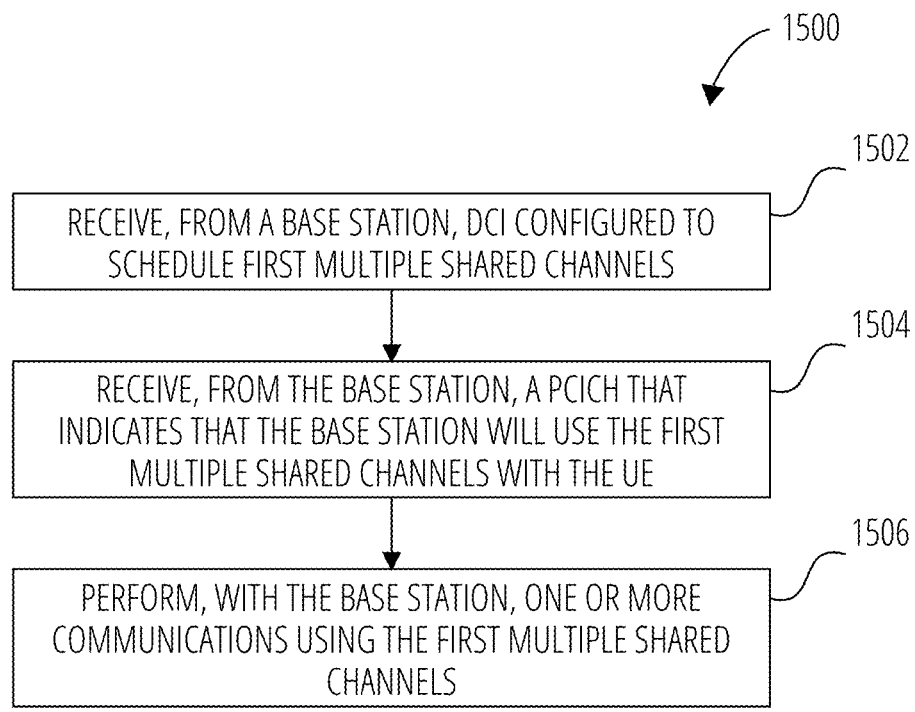
FIG. 15 illustrates a method of a UE, according to an embodiment.

FIG. 15 illustrates a method 1500 of a UE according to an embodiment. The method 1500 includes receiving 1502, from a base station, DCI configured to schedule first multiple shared channels.

The method 1500 further includes receiving 1504, from the base station, a PCICH that indicates that the base station will use the first multiple shared channels with the UE.

The method 1500 further includes performing 1506, with the base station, one or more communications using the first multiple shared channels.

In some embodiments of the method 1500, the PCICH is received on a first PRB of a CORESET. In some of these embodiments, the method 1500 also includes receiving, from the base station, a PRB index for the first PRB, and determining a location of the PRB within the CORESET based on the first PRB index. In some of these embodiments, the PCICH is further received on a second PRB of the CORESET. In some such cases (where the PCICH is further received on a second PRB of the CORESET), the second PRB comprises an RES bundle of the PCICH comprising multiple RES. In some such cases (where the PCICH is further received on a second PRB of the CORESET), the method 1300 further includes receiving, from the base station, a first PRB index for the first PRB, calculating a second PRB index based on the first PRB index, and determining a location of the second PRB within the CORESET based on the second PRB index. In some such cases (where the PCICH is further received on a second PRB of the CORESET), a location in the first PRB used to receive the PCICH and a location in the second PRB used to receive the PCICH is indicated to the UE by a bundle index value.

Embodiments contemplated herein include an apparatus comprising means to perform one or more elements of the method 1500. This apparatus may be, for example, an apparatus of a UE (such as a wireless device 1802 that is a UE, as described herein).

Embodiments contemplated herein include one or more non-transitory computer-readable media comprising instructions to cause an electronic device, upon execution of the instructions by one or more processors of the electronic device, to perform one or more elements of the method 1500. This non-transitory computer-readable media may be, for example, a memory of a UE (such as a memory 1806 of a wireless device 1802 that is a UE, as described herein).

Embodiments contemplated herein include an apparatus comprising logic, modules, or circuitry to perform one or more elements of the method 1500. This apparatus may be, for example, an apparatus of a UE (such as a wireless device 1802 that is a UE, as described herein).

Embodiments contemplated herein include an apparatus comprising: one or more processors and one or more computer-readable media comprising instructions that, when executed by the one or more processors, cause the one or more processors to perform one or more elements of the method 1500. This apparatus may be, for example, an apparatus of a UE (such as a wireless device 1802 that is a UE, as described herein).

Embodiments contemplated herein include a signal as described in or related to one or more elements of the method 1500.

Embodiments contemplated herein include a computer program or computer program product comprising instructions, wherein execution of the program by a processor is to cause the processor to carry out one or more elements of the method 1500. The processor may be a processor of a UE (such as a processor(s) 1804 of a wireless device 1802 that is a UE, as described herein). These instructions may be, for example, located in the processor and/or on a memory of the UE (such as a memory 1806 of a wireless device 1802 that is a UE, as described herein).

Figure 16:
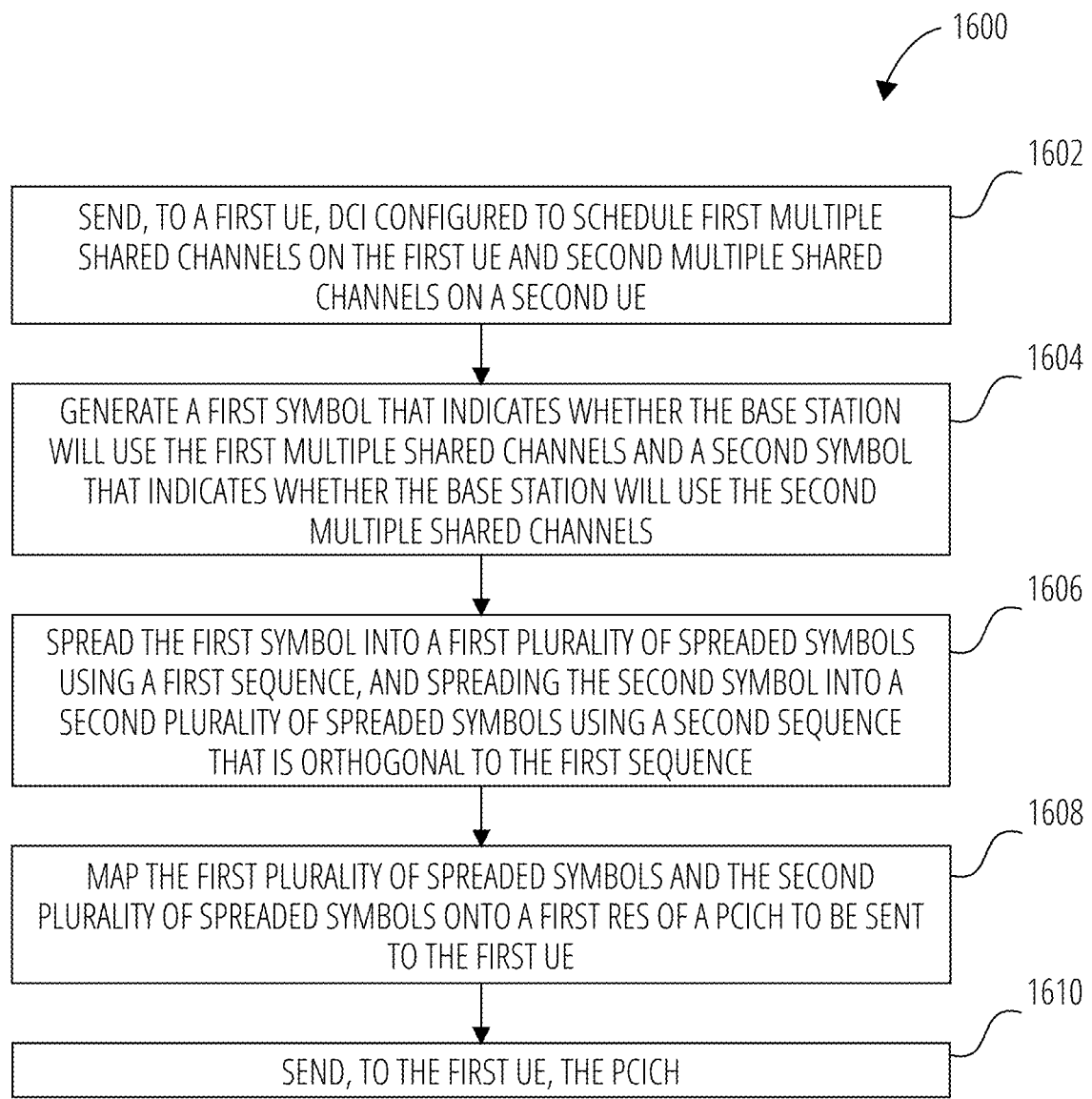
FIG. 16 illustrates a method of a base station, according to an embodiment.

FIG. 16 illustrates a method 1600 of a base station according to an embodiment. The method 1600 includes sending 1602, to a first UE, DCI configured to schedule first multiple shared channels on the first UE and second multiple shared channels on a second UE.

The method 1600 further includes generating 1604 a first symbol that indicates whether the base station will use the first multiple shared channels and a second symbol that indicates whether the base station will use the second multiple shared channels.

The method 1600 further includes spreading 1606 the first symbol into a first plurality of spreaded symbols using a first sequence, and spreading the second symbol into a second plurality of spreaded symbols using a second sequence that is orthogonal to the first sequence.

The method 1600 further includes mapping 1608 the first plurality of spreaded symbols and the second plurality of spreaded symbols onto a first RES of a PCICH to be sent to the first UE.

The method 1600 further includes sending 1610, to the first UE, the PCICH.

In some embodiments of the method 1600, the first symbol comprises a BPSK symbol.

In some embodiments of the method 1600, a size of the RES corresponds to a number of elements in the first sequence.

In some embodiments of the method 1600, the PCICH comprises a plurality of RES including the first RES, and a number of the plurality of RES corresponds to a number of elements in the first sequence.

In some embodiments of the method 1600, The method 1600 further includes mapping the first plurality of spreaded symbols and the second plurality of spreaded symbols onto a second RES of the PCICH. In some of these embodiments, the PCICH comprises a first RES bundle comprising the first RES and a second RES bundle comprising the second RES. In some such embodiments (where the PCICH comprises a first RES bundle comprising the first RES and a second RES bundle comprising the second RES), the PCICH is sent to the first UE on a physical resource block (PRB) of a core resource set (CORESET). In some such embodiments (where the PCICH comprises a first RES bundle comprising the first RES and a second RES bundle comprising the second RES), the first RES bundle further comprises a third RES. In some such embodiments (where the PCICH comprises a first RES bundle comprising the first RES and a second RES bundle comprising the second RES), the first RES bundle of the PCICH is sent to the first UE on a first physical resource block (PRB) of a core resource set (CORESET), and the second RES bundle of the PCICH is sent to the first UE on a second PRB of the CORESET. In some such embodiments (where the first RES bundle of the PCICH is sent to the first UE on a first physical resource block (PRB) of a core resource set (CORESET), and the second RES bundle of the PCICH is sent to the first UE on a second PRB of the CORESET), the method 1600 further includes sending, to the first UE, a bundle index parameter indicating a location of the first RES bundle on the first PRB and a location of the second RES bundle on the second PRB.

Embodiments contemplated herein include an apparatus comprising means to perform one or more elements of the method 1600. This apparatus may be, for example, an apparatus of a base station (such as a network device 1818 that is a base station, as described herein).

Embodiments contemplated herein include one or more non-transitory computer-readable media comprising instructions to cause an electronic device, upon execution of the instructions by one or more processors of the electronic device, to perform one or more elements of the method 1600. This non-transitory computer-readable media may be, for example, a memory of a base station (such as a memory 1822 of a network device 1818 that is a base station, as described herein).

Embodiments contemplated herein include an apparatus comprising logic, modules, or circuitry to perform one or more elements of the method 1600. This apparatus may be, for example, an apparatus of a base station (such as a network device 1818 that is a base station, as described herein).

Embodiments contemplated herein include an apparatus comprising: one or more processors and one or more computer-readable media comprising instructions that, when executed by the one or more processors, cause the one or more processors to perform one or more elements of the method 1600. This apparatus may be, for example, an apparatus of a base station (such as a network device 1818 that is a base station, as described herein).

Embodiments contemplated herein include a signal as described in or related to one or more elements of the method 1600.

Embodiments contemplated herein include a computer program or computer program product comprising instructions, wherein execution of the program by a processing element is to cause the processing element to carry out one or more elements of the method 1600. The processor may be a processor of a base station (such as a processor(s) 1820 of a network device 1818 that is a base station, as described herein). These instructions may be, for example, located in the processor and/or on a memory of the base station (such as a memory 1822 of a network device 1818 that is a base station, as described herein).

Figure 17:
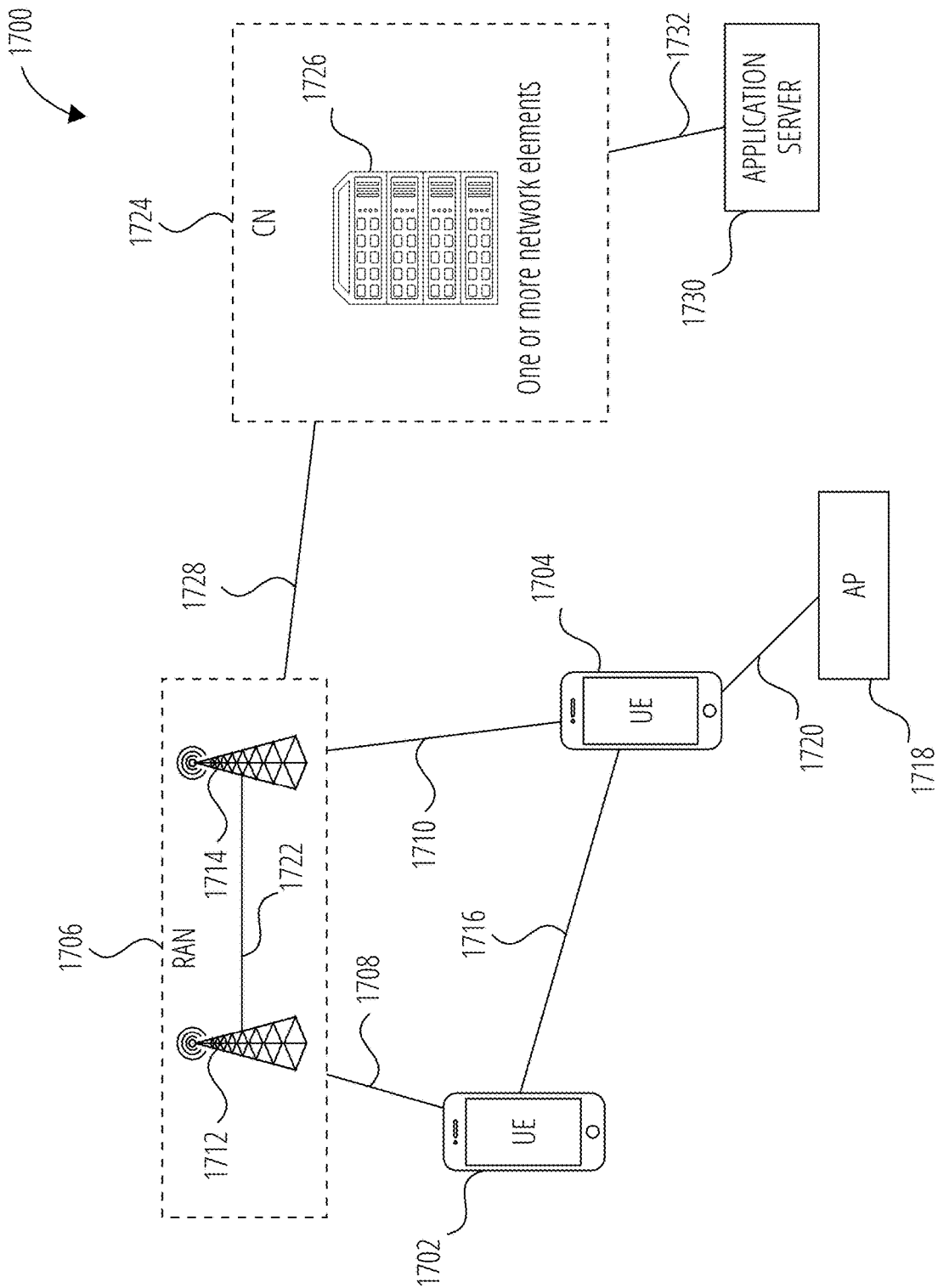
FIG. 17 illustrates an example architecture of a wireless communication system, according to embodiments disclosed herein.

FIG. 17 illustrates an example architecture of a wireless communication system 1700, according to embodiments disclosed herein. The following description is provided for an example wireless communication system 1700 that operates in conjunction with the LTE system standards and/or 5G or NR system standards as provided by 3GPP technical specifications.

As shown by FIG. 17, the wireless communication system 1700 includes UE 1702 and UE 1704 (although any number of UEs may be used). In this example, the UE 1702 and the UE 1704 are illustrated as smartphones (e.g., handheld touchscreen mobile computing devices connectable to one or more cellular networks), but may also comprise any mobile or non-mobile computing device configured for wireless communication.

The UE 1702 and UE 1704 may be configured to communicatively couple with a RAN 1706. In embodiments, the RAN 1706 may be NG-RAN, E-UTRAN, etc. The UE 1702 and UE 1704 utilize connections (or channels) (shown as connection 1708 and connection 1710, respectively) with the RAN 1706, each of which comprises a physical communications interface. The RAN 1706 can include one or more base stations, such as base station 1712 and base station 1714, that enable the connection 1708 and connection 1710.

In this example, the connection 1708 and connection 1710 are air interfaces to enable such communicative coupling, and may be consistent with RAT(s) used by the RAN 1706, such as, for example, an LTE and/or NR.

In some embodiments, the UE 1702 and UE 1704 may also directly exchange communication data via a sidelink interface 1716. The UE 1704 is shown to be configured to access an access point (shown as AP 1718) via connection 1720. By way of example, the connection 1720 can comprise a local wireless connection, such as a connection consistent with any IEEE 802.11 protocol, wherein the AP 1718 may comprise a Wi-Fi® router. In this example, the AP 1718 may be connected to another network (for example, the Internet) without going through a CN 1724.

In embodiments, the UE 1702 and UE 1704 can be configured to communicate using orthogonal frequency division multiplexing (OFDM) communication signals with each other or with the base station 1712 and/or the base station 1714 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 1712 or base station 1714 may be implemented as one or more software entities running on server computers as part of a virtual network. In addition, or in other embodiments, the base station 1712 or base station 1714 may be configured to communicate with one another via interface 1722. In embodiments where the wireless communication system 1700 is an LTE system (e.g., when the CN 1724 is an EPC), the interface 1722 may be an X2 interface. The X2 interface may be defined between two or more base stations (e.g., two or more eNBs and the like) that connect to an EPC, and/or between two eNBs connecting to the EPC. In embodiments where the wireless communication system 1700 is an NR system (e.g., when CN 1724 is a 5GC), the interface 1722 may be an Xn interface. The Xn interface is defined between two or more base stations (e.g., two or more gNBs and the like) that connect to 5GC, between a base station 1712 (e.g., a gNB) connecting to 5GC and an eNB, and/or between two eNBs connecting to 5GC (e.g., CN 1724).

The RAN 1706 is shown to be communicatively coupled to the CN 1724. The CN 1724 may comprise one or more network elements 1726, which are configured to offer various data and telecommunications services to customers/subscribers (e.g., users of UE 1702 and UE 1704) who are connected to the CN 1724 via the RAN 1706. The components of the CN 1724 may be implemented in one physical device or separate physical devices including components to read and execute instructions from a machine-readable or computer-readable medium (e.g., a non-transitory machine-readable storage medium).

In embodiments, the CN 1724 may be an EPC, and the RAN 1706 may be connected with the CN 1724 via an S1 interface 1728. In embodiments, the S1 interface 1728 may be split into two parts, an S1 user plane (S1-U) interface, which carries traffic data between the base station 1712 or base station 1714 and a serving gateway (S-GW), and the S1-MME interface, which is a signaling interface between the base station 1712 or base station 1714 and mobility management entities (MMEs).

In embodiments, the CN 1724 may be a 5GC, and the RAN 1706 may be connected with the CN 1724 via an NG interface 1728. In embodiments, the NG interface 1728 may be split into two parts, an NG user plane (NG-U) interface, which carries traffic data between the base station 1712 or base station 1714 and a user plane function (UPF), and the S1 control plane (NG-C) interface, which is a signaling interface between the base station 1712 or base station 1714 and access and mobility management functions (AMFs).

Generally, an application server 1730 may be an element offering applications that use internet protocol (IP) bearer resources with the CN 1724 (e.g., packet switched data services). The application server 1730 can also be configured to support one or more communication services (e.g., VoIP sessions, group communication sessions, etc.) for the UE 1702 and UE 1704 via the CN 1724. The application server 1730 may communicate with the CN 1724 through an IP communications interface 1732.

Figure 18:
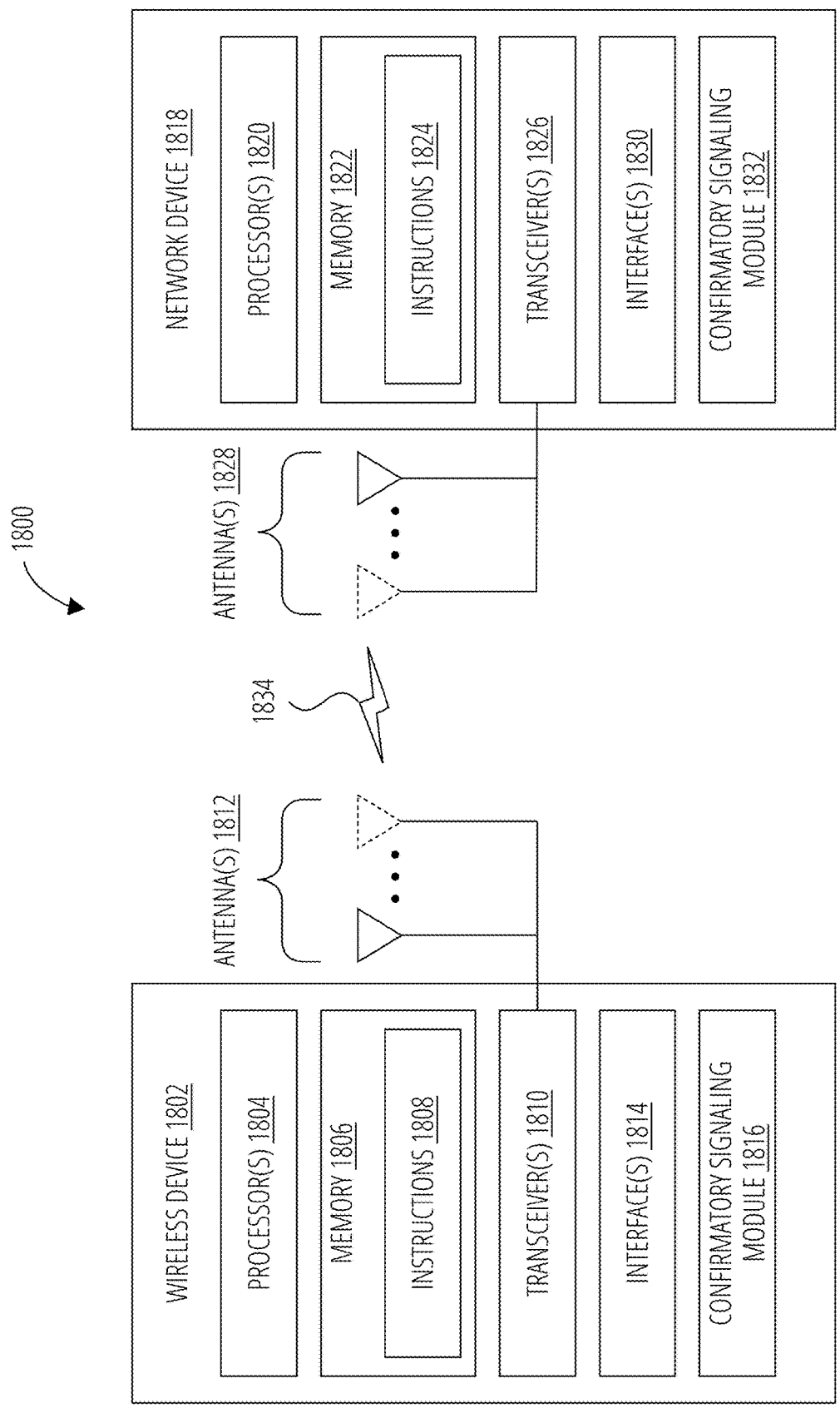
FIG. 18 illustrates a system for performing signaling between a wireless device and a network device, according to embodiments disclosed herein.

FIG. 18 illustrates a system 1800 for performing signaling 1834 between a wireless device 1802 and a network device 1818, according to embodiments disclosed herein. The system 1800 may be a portion of a wireless communications system as herein described. The wireless device 1802 may be, for example, a UE of a wireless communication system. The network device 1818 may be, for example, a base station (e.g., an eNB or a gNB) of a wireless communication system.

The wireless device 1802 may include one or more processor(s) 1804. The processor(s) 1804 may execute instructions such that various operations of the wireless device 1802 are performed, as described herein. The processor(s) 1804 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1802 may include a memory 1806. The memory 1806 may be a non-transitory computer-readable storage medium that stores instructions 1808 (which may include, for example, the instructions being executed by the processor(s) 1804). The instructions 1808 may also be referred to as program code or a computer program. The memory 1806 may also store data used by, and results computed by, the processor(s) 1804.

The wireless device 1802 may include one or more transceiver(s) 1810 that may include radio frequency (RF) transmitter and/or receiver circuitry that use the antenna(s) 1812 of the wireless device 1802 to facilitate signaling (e.g., the signaling 1834) to and/or from the wireless device 1802 with other devices (e.g., the network device 1818) according to corresponding RATs.

The wireless device 1802 may include one or more antenna(s) 1812 (e.g., one, two, four, or more). For embodiments with multiple antenna(s) 1812, the wireless device 1802 may leverage the spatial diversity of such multiple antenna(s) 1812 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1802 may be accomplished according to precoding (or digital beamforming) that is applied at the wireless device 1802 that multiplexes the data streams across the antenna(s) 1812 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1802 may implement analog beamforming techniques, whereby phases of the signals sent by the antenna(s) 1812 are relatively adjusted such that the (joint) transmission of the antenna(s) 1812 can be directed (this is sometimes referred to as beam steering).

The wireless device 1802 may include one or more interface(s) 1814. The interface(s) 1814 may be used to provide input to or output from the wireless device 1802. For example, a wireless device 1802 that is a UE may include interface(s) 1814 such as microphones, speakers, a touch-screen, buttons, and the like in order to allow for input and/or output to the UE by a user of the UE. Other interfaces of such a UE may be made up of transmitters, receivers, and other circuitry (e.g., other than the transceiver(s) 1810/antenna(s) 1812 already described) that allow for communication between the UE and other devices and may operate according to known protocols (e.g., Wi-Fi©, Bluetooth®, and the like).

The wireless device 1802 may include a confirmatory signaling module 1816. The confirmatory signaling module 1816 may be implemented via hardware, software, or combinations thereof. For example, the confirmatory signaling module 1816 may be implemented as a processor, circuit, and/or instructions 1808 stored in the memory 1806 and executed by the processor(s) 1804. In some examples, the confirmatory signaling module 1816 may be integrated within the processor(s) 1804 and/or the transceiver(s) 1810. For example, the confirmatory signaling module 1816 may be implemented by a combination of software components (e.g., executed by a DSP or a general processor) and hardware components (e.g., logic gates and circuitry) within the processor(s) 1804 or the transceiver(s) 1810.

The confirmatory signaling module 1816 may be used for various aspects of the present disclosure, for example, aspects of FIG. 1 through FIG. 5, FIG. 10, FIG. 12, FIG. 13, and FIG. 15. The confirmatory signaling module 1816 is configured to receive and decode confirmatory signaling from a base station, as described herein.

The network device 1818 may include one or more processor(s) 1820. The processor(s) 1820 may execute instructions such that various operations of the network device 1818 are performed, as described herein. The processor(s) 1804 may include one or more baseband processors implemented using, for example, a CPU, a DSP, an ASIC, a controller, an FPGA device, another hardware device, a firmware device, or any combination thereof configured to perform the operations described herein.

The network device 1818 may include a memory 1822. The memory 1822 may be a non-transitory computer-readable storage medium that stores instructions 1824 (which may include, for example, the instructions being executed by the processor(s) 1820). The instructions 1824 may also be referred to as program code or a computer program. The memory 1822 may also store data used by, and results computed by, the processor(s) 1820.

The network device 1818 may include one or more transceiver(s) 1826 that may include RF transmitter and/or receiver circuitry that use the antenna(s) 1828 of the network device 1818 to facilitate signaling (e.g., the signaling 1834) to and/or from the network device 1818 with other devices (e.g., the wireless device 1802) according to corresponding RATs.

The network device 1818 may include one or more antenna(s) 1828 (e.g., one, two, four, or more). In embodiments having multiple antenna(s) 1828, the network device 1818 may perform MIMO, digital beamforming, analog beamforming, beam steering, etc., as has been described.

The network device 1818 may include one or more interface(s) 1830. The interface(s) 1830 may be used to provide input to or output from the network device 1818. For example, a network device 1818 that is a base station may include interface(s) 1830 made up of transmitters, receivers, and other circuitry (e.g., other than the transceiver(s) 1826/antenna(s) 1828 already described) that enables the base station to communicate with other equipment in a core network, and/or that enables the base station to communicate with external networks, computers, databases, and the like for purposes of operations, administration, and maintenance of the base station or other equipment operably connected thereto.

The network device 1818 may include a confirmatory signaling module 1832. The confirmatory signaling module 1832 may be implemented via hardware, software, or combinations thereof. For example, the confirmatory signaling module 1832 may be implemented as a processor, circuit, and/or instructions 1824 stored in the memory 1822 and executed by the processor(s) 1820. In some examples, the confirmatory signaling module 1832 may be integrated within the processor(s) 1820 and/or the transceiver(s) 1826. For example, the confirmatory signaling module 1832 may be implemented by a combination of software components (e.g., executed by a DSP or a general processor) and hardware components (e.g., logic gates and circuitry) within the processor(s) 1820 or the transceiver(s) 1826.

The confirmatory signaling module 1832 may be used for various aspects of the present disclosure, for example, aspects of FIG. 1 through FIG. 12, FIG. 14, and FIG. 16. The confirmatory signaling module 1832 is configured to encode and send confirmatory signaling to a UE, as described herein.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE), comprising:
  receiving, from a base station, first downlink control information (DCI) that schedules first multiple shared channels, wherein the first multiple shared channels comprise one of multiple physical uplink shared channels (multi-PUSCH) and multiple physical downlink shared channels (multi-PDSCH);
  receiving, from the base station, second DCI comprising confirmatory signaling that prevents a cancellation of the first multiple shared channels by indicating that the base station will use the first multiple shared channels with the UE as scheduled by the first DCI; and
  performing, with the base station, one or more communications using the first multiple shared channels.

2. The method of claim 1, wherein:
  the first DCI is received during a first monitoring occasion (MO) of a first search space (SS) configuration at the UE; and
  the second DCI is received during a second MO of a second SS configuration at the UE.

3. The method of claim 2, wherein the UE determines that the second MO is a proximate MO of the second SS configuration relative to a time of first MO.

4. The method of claim 1, wherein the second DCI is for a plurality of UE that includes the UE and comprises a block of data associated with the UE that comprises the confirmatory signaling.

5. The method of claim 4, wherein the block of data is located within the second DCI by the UE according to a starting position parameter provided to the UE by the base station.

6. The method of claim 1, further comprising identifying the second DCI as containing the confirmatory signaling using a radio network temporary identifier (RNTI) corresponding to the second DCI.

7. The method of claim 1, further comprising identifying the second DCI as containing the confirmatory signaling based on an indication found in the second DCI that it comprises the confirmatory signaling.

8. The method of claim 1, wherein:
  the first multiple shared channels are scheduled on a first component carrier (CC) used by the UE; and
  the confirmatory signaling comprises a bitmap comprising a first bit corresponding to the first CC that indicates that the base station will use the first multiple shared channels.

9. The method of claim 8, wherein:
  the first DCI further schedules second multiple shared channels on a second CC used by the UE; and
  the bitmap further comprises a second bit corresponding to the second CC that indicates that the base station will not use the second multiple shared channels.

10. The method of claim 8, wherein:
  the confirmatory signaling further comprises a second bit corresponding to a second CC; and
  the first bit and the second bit are ordered within the bitmap in an ascending CC index order.

11. The method of claim 1, wherein the first DCI indicates an aggregation level used by the second DCI.

12. The method of claim 1, wherein the first DCI indicates that the second DCI will be sent.

13. The method of claim 1, wherein:
  the first DCI comprises a HARQ process number; and
  the second DCI comprises the HARQ process number.

14. The method of claim 1, wherein the second DCI updates a modulation and coding scheme (MCS) used by the UE that was indicated in the first DCI.

15. A method of a base station, comprising:
  sending, to a user equipment (UE), first downlink control information (DCI) that schedules first multiple shared channels, wherein the first multiple shared channels comprise one of multiple physical uplink shared channels (multi-PUSCH) and multiple physical downlink shared channels (multi-PDSCH);
  sending, to the UE, second DCI comprising confirmatory signaling that indicates prevents a cancellation of the first multiple shared channels by indicating that the base station will use the first multiple shared channels with the UE as scheduled by the first DCI; and
  performing, with the UE, one or more communications using the first multiple shared channels.

16. The method of claim 15, wherein the second DCI is for a plurality of UE that comprises the UE and comprises a block of data associated with the first UE that comprises the confirmatory signaling.

17. The method of claim 15, wherein:
  the first multiple shared channels are scheduled on a first component carrier (CC) used by the UE; and
  the confirmatory signaling comprises a bitmap comprising a first bit corresponding to the first CC that indicates that the base station will use the first multiple shared channels.

18. The method of claim 17, wherein:
  the first DCI further schedules second multiple shared channels on a second CC used by the UE; and
  the bitmap further comprises a second bit corresponding to the second CC that indicates that the base station will not use the second multiple shared channels.

19. A method of a user equipment (UE), comprising:
  receiving, from a base station, downlink control information (DCI) configured to schedule first multiple shared channels, wherein the first multiple shared channels comprise one of multiple physical uplink shared channels (multi-PUSCH) and multiple physical downlink shared channels (multi-PDSCH);

receiving, from the base station, a physical confirmation indicator channel (PCICH) that prevents a cancellation of the first multiple shared channels by indicating that the base station will use the first multiple shared channels with the UE as scheduled by the first DCI; and performing, with the base station, one or more communications using the first multiple shared channels.

* * * * *